United States Patent
Abe

(10) Patent No.: US 6,970,600 B2
(45) Date of Patent: Nov. 29, 2005

(54) APPARATUS AND METHOD FOR IMAGE PROCESSING OF HAND-WRITTEN CHARACTERS USING CODED STRUCTURED LIGHT AND TIME SERIES FRAME CAPTURE

(75) Inventor: Tsutomu Abe, Nakai-machi (JP)

(73) Assignee: Fuji Xerox Co., Ltd., Tokyo (JP)

(*) Notice: Subject to any disclaimer, the term of this patent is extended or adjusted under 35 U.S.C. 154(b) by 749 days.

(21) Appl. No.: 09/892,884

(22) Filed: Jun. 28, 2001

(65) Prior Publication Data

US 2002/0001029 A1  Jan. 3, 2002

(30) Foreign Application Priority Data

Jun. 29, 2000 (JP) ............................. 2000-196051
Apr. 6, 2001 (JP) ............................. 2001-108353

(51) Int. Cl.[7] .......................... G06K 9/00; G06K 9/18; G06K 9/62; G09G 5/00; H04N 7/14
(52) U.S. Cl. ...................... 382/187; 382/186; 382/157; 345/178; 725/19; 348/14.16
(58) Field of Search .................... 382/154, 183–189; 345/773, 178, 848–852, 863, 865; 725/19; 348/14.16

(56) References Cited

U.S. PATENT DOCUMENTS

| | | | |
|---|---|---|---|
| 4,687,326 A * | 8/1987 | Corby, Jr. .................. 356/5.01 |
| 5,201,011 A * | 4/1993 | Bloomberg et al. ......... 382/175 |
| 5,436,639 A * | 7/1995 | Arai et al. .................. 345/156 |
| 5,528,290 A * | 6/1996 | Saund ...................... 348/218.1 |
| 5,581,637 A * | 12/1996 | Cass et al. .................. 382/284 |
| 5,668,897 A * | 9/1997 | Stolfo ....................... 382/283 |
| 5,732,227 A * | 3/1998 | Kuzunuki et al. .......... 715/775 |
| 5,760,925 A * | 6/1998 | Saund et al. ............... 358/497 |
| 5,764,383 A * | 6/1998 | Saund et al. ............... 358/497 |
| 5,886,342 A * | 3/1999 | Matsui .................... 250/208.1 |
| 6,023,534 A * | 2/2000 | Handley ................... 382/275 |
| 6,028,672 A * | 2/2000 | Geng ....................... 356/602 |
| 6,044,165 A * | 3/2000 | Perona et al. .............. 382/103 |
| 6,125,197 A * | 9/2000 | Mack et al. ............... 382/154 |
| 6,256,411 B1 * | 7/2001 | Iida ........................... 382/203 |

(Continued)

FOREIGN PATENT DOCUMENTS

JP  A 4-126447  4/1992

(Continued)

OTHER PUBLICATIONS

Zhnag et al. "Spacetime Stereo: Shape Recovery for Dynamic Scenes", IEEE 2003.*

(Continued)

Primary Examiner—Amelia M. Au
Assistant Examiner—Wes Tucker
(74) Attorney, Agent, or Firm—Oliff & Berridge, PLC

(57) ABSTRACT

The present invention provides an image processing apparatus that efficiently identifies input characters and the like by an intensity image analysis based on range information. The image processing apparatus performs distance measurement by performing three-dimensional measurement by pattern projection to characters written to a manuscript, whiteboard, and the like, gets an intensity image used as a so-called actual image and an image for distance measurement in parallel, and identifies input characters by an intensity image analysis based on range information. The image processing apparatus picks up characters, patterns, and the like written onto paper or the like with a pen, performs geometric transformation for picked-up images, and performs natural input character analysis and reading processing. Furthermore, by comparing images picked up in a time-series, noise elimination and manuscript position modifications become possible.

38 Claims, 31 Drawing Sheets

U.S. PATENT DOCUMENTS

| | | | |
|---|---|---|---|
| 6,320,983 B1 * | 11/2001 | Matsuno et al. | 382/186 |
| 6,356,298 B1 * | 3/2002 | Abe et al. | 348/47 |
| 6,377,700 B1 * | 4/2002 | Mack et al. | 382/154 |
| 6,411,732 B1 * | 6/2002 | Saund | 382/187 |
| 6,563,948 B2 * | 5/2003 | Tan et al. | 382/187 |
| 6,674,893 B1 * | 1/2004 | Abe et al. | 382/154 |
| 6,697,536 B1 * | 2/2004 | Yamada | 382/275 |
| 6,701,013 B1 * | 3/2004 | Charpentier | 382/175 |
| 6,750,873 B1 * | 6/2004 | Bernardini et al. | 345/582 |

FOREIGN PATENT DOCUMENTS

| | | |
|---|---|---|
| JP | A 5-332737 | 12/1993 |
| JP | A 11-136563 | 5/1999 |
| JP | A 11-136564 | 5/1999 |
| JP | A 2000-9442 | 1/2000 |
| JP | A 2000-65542 | 3/2000 |
| JP | A 2000-105818 | 4/2000 |

OTHER PUBLICATIONS

Chen et al. "Passive and Active Stereo Vision for Smooth Surface Detection of Deformed Plates", IEEE, 1995.*

Sargur et al. "A System to Read Names and Addresses on Tax Forms", IEEE, 1996.*

Wellner. "Interacting with Paper on the Digital Desk", ACM, 1993.*

Ishii et al. "Interactive Design of Seamless Collaboration Media". ACM, 1994.*

McGee et al. "Something From Nothing; Augmenting a Paper-based Work Practice via Multimodal Interaction". ACM, 2000.*

Tang et al. "VideoDraw: A Video Interface for Collaborative Drawing". ACM, 1991.*

Yamashita et al. "Adaptive Annotation Using a Human-Robot Interface System Partner". IEEE, 2001.*

Kang et al. "A Multibaseline Stereo System with Active Illumination adn Real-Time Image Acquisition", IEEE, 1995.*

Battle et al. "Recent Progress in Coded Structured Light as a Technique to Solve the Correspondence Problem", Pattern Recognition, vol. 31, No. 7, pp. 963-982, 1998 © Pattern Recognition Society.*

Ye et al. "A Generic System to Extract and Clean Handwritten Data From Business Forms. Proceedings of the Workshop on Frontiers in Handwriting Recognition", Sep. 2000.*

Kochi et al. "User-Defined Template for Identifying Document Type and Extracting Information from Documents", IEEE, Sep. 1999.*

M.E. Munich and P. Perona, "Visual Input for Pen-based Computers", Proceeding of the ICPR'96 © IEEE, 1996.*

M.E. Munich and P. Perona, "Camera-Based ID Verification by Signature Tracking", Proceedings of the 5th European Conference on Computer Vision-Volume, 1998.*

G. Fink et al., "Video-Based On-Line Handwriting Recognition", Proceedings of the International Conference on Document Analysis and Recognition © IEEE, 2001.*

M. Wienecke et al., "A Handwriting Recognition System Based on Visual Input", 2nd International Workshop on Computer Visio Systems © IEEE, 2001.*

T. Yamasaki et al., "A New Tablet System for Handwriting Characters and Drawing Based on the Image Processing" © IEEE, 1996.*

J.L. Crowley et al., "Finger Tracking as an Input Device for Augmented Reality", Proceedings of the IWAFGR, 1995.*

J.L. Crowley et al., "Vision for a Man Machine Interaction", EHCI '95, Aug. 1995.*

H. [Bunke99] et al., "Online Handwriting Data Acquisition Using a Video Camera", Fifth International Conference on Document Analysis and Recognition, Sep. 1999.*

* cited by examiner 3 1 2 1 2 3 1 3 1 2 3 2

3 1 0 1 2 3 1 3 1 2 3 2

3 1 2 1 2 3 1 3 1 2 3 2
3 1 3 1 2 3 1 3 1 2 3 2
3 1 2 1 2 3 1 3 1 2 3 2

801

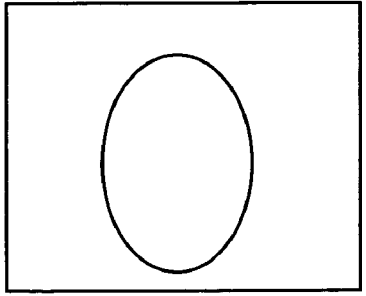
FIG.17C
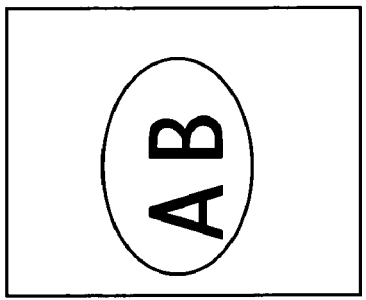
FIG.17B
FIG.17E
A B
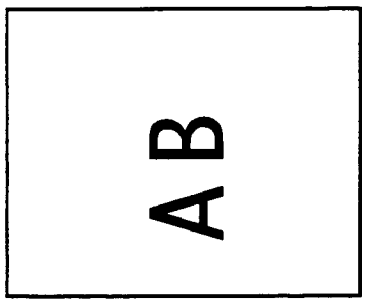
FIG.17A
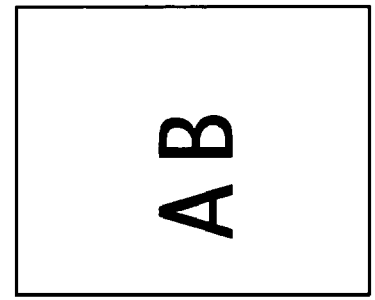
FIG.17D

FIG.21

BUSINESS TRIP EXPENSE BILL

| BELONG TO | | EMPLOYEE NO. | | SEAL |
|---|---|---|---|---|
| CODE | | NAME | | |

| PERIOD | REGION | CLASSIFI-CATION | AFFAIR |
|---|---|---|---|
| FROM / TO / JOB END TIME : | | OFFICIAL INFORMAL | |

| DATE | SECTION | TRAIN | TAXI | LODGING | TOTAL |
|---|---|---|---|---|---|
| / | TO | YEN | YEN | YEN | YEN |
| / | TO | YEN | YEN | YEN | YEN |
| | TOTAL EXPENSE | | | | YEN |

DAILY ALLOWANCE [ YEN ]  CHARGE [ YEN ]

FIG.24

BUSINESS TRIP EXPENSE BILL

PREPAID (SETTLEMENT)

| BELONG TO | CORPORATE RESEARCH LABS. | EMPLOYEE NO. | 1 2 3 7 8 | SEAL |
|---|---|---|---|---|
| | CODE | 6 1 0 1 3 1 | NAME | TSUTOMU ABE | 業務 00.09.02 安部 |

| PERIOD | REGION | CLASSIFICATION | AFFAIR |
|---|---|---|---|
| FROM 30/7 TO / JOB END TIME 17:00 | SHINJUKU | (OFFICIAL) INFORMAL | CONSULTATION ON JOB |

| DATE | SECTION | TRAIN | TAXI | LODGING | TOTAL |
|---|---|---|---|---|---|
| 7/30 | EBINA TO SHINJUKU | 960 YEN | YEN | YEN | 960 YEN |
| / | TO | YEN | YEN | YEN | YEN |
| | | | | TOTAL EXPENSE | 960 YEN |

DAILY ALLOWANCE 2160 YEN

CHARGE 2160 YEN

FIG.25

FILE  EDIT  DISPLAY  INSERT  FORMAT  TOOL  DATA

| | A | B | C | D | E | F | G | H |
|---|---|---|---|---|---|---|---|---|
| 1 | | | | BUSINESS TRIP EXPENSE BILL LIST | | | | |
| 2 | BELONG TO | CODE | EMPLOYEE NO. | NAME | TRIP PERIOD | REGION | CLASSIFI-CATION | |
| 3 | CORPORATE RESEARCH LABS. | 610131 | 12378 | TSUTOMU ABE | 7/30 ~ | SHINJUKU | OFFICIAL | |
| 4 | CORPORATE RESEARCH LABS. | 338821 | 17324 | KAZUO SUZUKI | 8/1 ~ | KOBE | OFFICIAL | |
| 5 | TOKYO OFFICE | 123234 | 66775 | HANAKO TANAKA | 8/11 ~ | OSAKA | OFFICIAL | |
| 6 | HEAD OFFICE | 342321 | 786549 | SADAJI NAGASHIMA | 8/30 ~ | SAPPORO | OFFICIAL | |
| | ....... | ....... | ....... | ....... | ....... | ....... | ....... | |

APPARATUS AND METHOD FOR IMAGE PROCESSING OF HAND-WRITTEN CHARACTERS USING CODED STRUCTURED LIGHT AND TIME SERIES FRAME CAPTURE

BACKGROUND OF THE INVENTION

1. Field of the Invention

The present invention relates to an image processing apparatus, an image processing method, and a storage medium storing a program that measure a shape to be picked up, and more particularly to an image processing apparatus, an image processing method, and a storage medium storing a program that perform image pickup of characters, patterns, and the like written onto paper or the like with a pen, perform geometric transformation for picked-up images, and perform natural input character analysis and reading processing.

2. Description of the Related Art

With the development of a computer, various input devices such as a keyboard, mouse, and tablet are being developed. As devices for inputting handwritten characters, a tablet as shown in FIG. 31 is finding widespread use.

A tablet-type input device as shown in FIG. 31 requires dedicated input devices. Since a so-called dedicated pen 3102 and a dedicated input device 3101 are used, the operation environment is different from the input environment of writing to paper. To input characters written to normal paper to a personal computer or the like, they must be inputted to a scanner, digital camera, or the like.

In Japanese Published Unexamined Patent Application No. Hei 4-126447, there is disclosed a system which obtains images comparable to the resolution of flatbed-type scanners employing one-dimensional line sensors, using a two-dimensional image pickup element. To be more specific, a distance input part is used in the two-dimensional image pickup element to calculate the shape of subjects, and manuscript information is reproduced on a flat plane by geometric transformation.

Furthermore, in Japanese Published Unexamined Patent Application No. Hei 11-136563, there is disclosed a system which reads an image by detecting manuscript tilt information by: a distance measuring sensor, which includes an imaging optical system having an automatic focus mechanism, and an image pickup element for reading a manuscript image through the imaging optical system, and measures a distance from an image pickup face of the manuscript image to the center of the image pickup element (optical axis); a manuscript face angle input part that inputs information on an angle of a face on which a manuscript image is placed, with respect to a horizontal face; and range information of the distance measuring sensor and angle information of the manuscript face angle input part.

In Japanese Published Unexamined Patent Application No. Hei 11-136564, there is a system which uses a distance measuring part, which includes an imaging optical system, and an image pickup element for reading a manuscript image through the imaging optical system, and measures respective distances from any three points on an image pickup face of the manuscript image to the image pickup element, and range information of the three points obtained by the distance measuring part, to detect information on a tilt of the manuscript face to the image pickup element so that highly precise images can be obtained by keeping track of tilts of the manuscript face to the image pickup element face.

General methods for measuring distances and shapes include a space coding method as disclosed in Japanese Published Unexamined Patent Application No. Hei 5-332737, and a stereo image method having plural image pickup elements.

To input or recognize handwritten characters, a tablet device having a dedicated pen and a dedicated input device as described above is used, or after an image is read by keeping track of manuscript tilts using the above-described distance measuring part, the image is analyzed by geometric transformation (projective transformation). However, the above-described configuration has the disadvantage that the apparatus becomes costly because a special distance measuring part is required, bringing the apparatus into a large scale.

SUMMARY OF THE INVENTION

According to an aspect of the present invention, an image processing apparatus efficiently identifies, for example, input characters and the like by an intensity image analysis based on range information. The image processing apparatus performs distance measurement by performing three-dimensional measurement by pattern projection, for example, to written characters and gets an intensity image as a so-called actual image and an image for distance measurement in parallel, and identifies, for example, input characters by an intensity image analysis based on range information.

The image processing apparatus, for example, picks up characters, patterns, and the like written on paper or like with a pen, performs geometric transformation for picked up images, and performs natural input character analysis and read processing. Furthermore, by comparing images picked up in a time-series, noise elimination and manuscript position modifications become possible.

These and other characteristics and advantages of the present invention will become apparent by more detailed descriptions based on embodiments of the present invention to be described and accompanying drawings.

The present invention has been made in view of the above circumstances and provides an image processing apparatus and an image processing method that perform distance measurement with a simple construction, gets an intensity image used as a so-called actual image and an image for distance measurement in parallel, and identifies input characters by an intensity image analysis based on range information.

According to an aspect of the present invention, the image processing apparatus has: a three-dimensional image pickup part that includes a projecting part that projects patterns, a first image pickup part that picks up an intensity image and a projection pattern image from the direction of an optical axis of the projecting part, and a second image pickup part that picks up the projection pattern image from a direction different from the optical axis of the projecting part. First range information is created based on a pattern picked up by the second image pickup part and a geometric transformation part that performs geometric transformation for the intensity image picked up by the first image pickup part based on the range information.

Furthermore, in the image processing apparatus of the present invention, for areas where the amount of change of the picked-up pattern by the first image pickup part with respect to the projection pattern is equal to or greater than a predetermined value, new codes corresponding to the picked-up pattern by the first image pickup part may be assigned, and the first range information may be created from the picked-up pattern by the second image pickup part, based on the new codes.

Furthermore, the image processing apparatus may further have: a frame data comparison part that makes comparisons between frame data images picked up in a time-series by the three-dimensional image pickup part; and an image processing part that eliminates noise data from the frame data images based on a result of making comparisons between the frame data images in the frame data comparison part.

Furthermore, the image processing apparatus may further have: a frame data comparison part that makes comparisons between frame data images picked up in a time-series by the three-dimensional image pickup part; and an image processing part that modifies image positions of the frame data images based on a result of making comparisons between the frame data images in the frame data comparison part.

Furthermore, the image processing apparatus may further have: a storage part that stores, as initial frame data, an initial image of frame data picked up in a time-series by the three-dimensional image pickup part; a frame data comparison part that makes comparisons between frame data images picked up in a time-series by the three-dimensional image pickup part; and an image processing part that extracts only differential data as storage data, based on a result of comparing, in the frame data comparison part, the initial frame data with frame data subsequently picked up.

Furthermore, in the image processing apparatus of the present invention, the projecting part may have a light source to emit light of an invisible region; and the first and second image pickup parts may have a filter for transmitting light of an invisible region and a filter for cutting off light of an invisible region, and may pick up pattern projection images and intensity images in parallel.

Furthermore, in the image processing apparatus of the present invention, for areas where the amount of change of the picked-up pattern by the first image pickup part with respect to the projection pattern by the projecting part is less than a predetermined value, second range information may be created by bringing the areas into correspondences with respective pieces of intensity information obtained by the first and second image pickup parts.

Furthermore, in the image processing apparatus of the present invention, the second image pickup part may include plural image pickup parts that pick up the measurement target at different angles, and range information may be created based on projection patterns respectively picked up by the plural image pickup parts.

Furthermore, according to another aspect of the present invention, the image processing method includes: a projecting step that projects patterns by a projecting part; an image pickup step that picks up an intensity image and a projection pattern image by a first image pickup part from an optical axis direction of the projecting part, and picks up the projection pattern image by a second image pickup part from a direction different from the optical axis direction of the projecting part; a range information creation step that creates first range information, based on a picked-up pattern picked up by the second image pickup part; and a geometric transformation step that performs geometric transformation for the intensity image produced by the first image pickup part, based on the range information.

Furthermore, in the image processing method of the present invention, the range information creation step may include the step of: for areas where the amount of change of the picked-up pattern by the first image pickup part with respect to the projection pattern is equal to or greater than a predetermined value, assigning new codes corresponding to the picked-up pattern by the first image pickup part, and creating the first range information from the picked-up pattern by the second image pickup part, based on the new codes.

Furthermore, the image processing method may further include: a frame data comparison step that makes comparisons between frame data images picked up in a time-series in the image pickup step; and an image processing step that eliminates noise data from the frame data images, based on a result of making comparisons between the frame data images in the frame data comparison step.

Furthermore, the image processing method may further include: the frame data comparison step that makes comparisons between frame data images picked up in a time-series in the image pickup step; and an image processing step that modifies image positions of the frame data images, based on a result of making comparisons between the frame data images in the frame data comparison step.

Furthermore, the image processing method may further include: a storage step that stores an initial image of frame data picked up in a time-series in the image pickup step in a storage part as initial frame data; a frame data comparison step that makes comparisons between frame data images picked up in a time-series in the image pickup step; and an image processing step that extracts only differential data as storage data, based on a result of comparing, in the frame data comparison step, the initial frame data and frame data got subsequently.

Furthermore, in the image processing method of the present invention, the pattern projecting step may use the light source as an invisible-region light source using infrared or ultraviolet light, and may form pattern light by invisible-region light; and the image pickup step may pick up pattern projection images and intensity images in parallel.

Furthermore, in the image processing method of the present invention, for areas where the amount of change of the picked-up pattern by the first image pickup part with respect to the projection pattern by the projecting part is less than a predetermined value, second range information may be created by bringing the areas into correspondences with respective pieces of intensity information obtained by the first and second image pickup parts.

Furthermore, in the image processing method of the present invention, the second image pickup part may include plural image pickup parts that pick up the measurement target at different angles, and the method may include the step of creating range information, based on projection patterns respectively picked up by the plural image pickup parts.

According to another aspect of the present invention, the image processing apparatus includes: a projecting part that projects light to an image holding medium to form an image thereon; an image pickup part that picks up the image formed on the image holding medium; an intensity image acquisition part that acquires an intensity image, based on the image picked up in the image pickup part; a range information acquisition part that acquires range information from the picked-up image; a geometric transformation part that performs geometric transformation for the intensity image, based on the range information acquired in the range information acquisition part; and an image extracting part that extracts differences between the geometric-transformed intensity image and the intensity image acquired in advance.

Furthermore, in the image processing apparatus of the present invention, the image holding medium is one of a manuscript sheet, whiteboard, blackboard, screen, wall, and screen projection sheet.

Furthermore, in the image processing apparatus of the present invention, the intensity image acquired in advance as a processing target in the image extracting part may be a preceding frame image inputted precedent to the geometric transformation part.

Furthermore, in the image processing apparatus of the present invention, the intensity image acquired in advance as a processing target in the image extracting part may be image data stored in advance in the storage part.

Furthermore, the image processing apparatus may include: a document database in which plural pieces of document format data are stored; and a document identifying part that performs matching between the geometric-transformed intensity image and format images stored in the document database. The image extracting part may extract differences between the geometric-transformed intensity image and format images stored in the document database.

Furthermore, the image processing apparatus may further have a character transformation processing construction that reads character data extracted by the image extracting part and transforms it to character data replaceable as code values.

Furthermore, the image processing apparatus may further include: an authentication information database in which handwriting history data of registered users is stored; and an authentication processing part that inputs the geometric-transformed intensity image and performs matching between the input image and handwriting history data stored in the authentication information database.

Furthermore, in the image processing apparatus of the present invention, the authentication information database may store handwriting history data and signature shape data of registered users; and the authentication processing part may input the geometric-transformed intensity image, and performs matching between the input image and the handwriting history data stored in the authentication information database, and between the input image and the signature shape data.

Furthermore, the image processing apparatus may further include a display part that displays an image produced as a result of performing geometric transformation for the intensity image, based on the range information in the geometric transformation part.

Furthermore, in the image processing apparatus of the present invention, a distance between an image holding medium and the image pickup part may be fixed; the image processing apparatus may include a storage part that stores range information acquired by the range information acquisition part; and the geometric transformation part performs geometric transformation for the intensity image, based on the range information stored in the storage part.

Furthermore, according to another aspect of the present invention, the image processing method includes: a projecting step that projects light to an image holding medium to form an image thereon; an image pickup step that picks up the image formed on the image holding medium; an intensity image acquisition step that acquires an intensity image, based on the image picked up in the image pickup step; a range information acquisition step that acquires range information from the picked-up image; a geometric transformation step that performs geometric transformation for the intensity image, based on the range information acquired in the range information acquisition step; and an image extracting step that extracts differences between the geometric-transformed intensity image and the intensity image acquired in advance.

Furthermore, in the image processing method of the present invention, the image holding medium is one of a manuscript sheet, whiteboard, blackboard, screen, wall, and screen projection sheet.

Furthermore, in the image processing method of the present invention, the intensity image acquired in advance as a processing target in the image extracting step may be a preceding frame image inputted precedent to the geometric transformation step.

Furthermore, in the image processing method of the present invention, the intensity image acquired in advance as a processing target in the image extracting step may be image data stored in advance in the storage part.

Furthermore, the method may further include: a document identifying step that performs matching between the geometric-transformed intensity image and format images stored in the document database in which plural pieces of document format data are stored. The image extracting step may extract differences between the geometric-transformed intensity image and format images stored in the document database.

Furthermore, the method may further have a character transformation processing step that reads character data extracted in the image extracting step and transforms it to character data replaceable as code values.

Furthermore, the method may include: an authentication processing step that inputs the geometric-transformed intensity image and performs matching between the input image and handwriting history data stored in the authentication information database in which handwriting history data of registered users is stored.

Furthermore, in the image processing apparatus of the present invention, the authentication information database may store handwriting history data and signature shape data of registered users; and the authentication processing step may input the geometric-transformed intensity image, and performs matching between the input image and the handwriting history data stored in the authentication information database, and between the input image and the signature shape data.

Furthermore, the method may further include a display step that displays an image produced as a result of performing geometric transformation for the intensity image, based on the range information in the geometric transformation step.

Furthermore, in the image processing method of the present invention, a distance between an image holding medium and the image pickup part may be fixed; the image processing method may include a storage step that stores range information acquired by the range information acquisition part; and the geometric transformation step performs geometric transformation for the intensity image, based on the range information stored in the storage step.

Furthermore, according to another aspect of the present invention, a storage medium readable by a computer, which stores a program of instructions executable by the computer to perform method steps for performing image processing is provided. The method includes the steps of: projecting light to an image holding medium to form an image thereon; picking up the image formed on the image holding medium; acquiring an intensity image based on the image picked up in the image pickup step; acquiring range information from the picked-up image; performing geometric transformation for the intensity image based on the range information acquired in the range information acquisition step; and extracting difference between the geometric-transformed intensity image and the intensity image acquired in advance.

Furthermore, according to another aspect of the present invention, an image processing apparatus includes: a projecting part that projects light; an image pickup part that picks up the projected light; an intensity image acquisition part that acquires an intensity image from the picked-up light; a range information acquisition part that acquires range information from the picked-up light; a geometric transformation part that performs geometric transformation for the intensity image, based on the range information; and an image extracting part that extracts differences between the intensity image subjected to the geometric transformation and an intensity image acquired in advance.

Furthermore, according to another aspect of the present invention, an image processing method includes: a projecting step that projects light; an image pickup step that picks up the projected light; an intensity image acquisition step that acquires an intensity image from the picked-up light; a range information acquisition step that acquires range information from the picked-up light; a geometric transformation step that performs geometric transformation for the intensity image, based on the range information; and an image extracting step that extracts differences between the intensity image subjected to the geometric transformation and an intensity image acquired in advance.

Furthermore, according to another aspect of the present invention, a storage medium readable by a computer, which stores a program of instructions executable by the computer to perform method steps for performing image processing is provided. The method includes the steps of: a projecting step that projects light; an image pickup step that picks up the projected light; an intensity image acquisition step that acquires an intensity image from the picked-up light; a range information acquisition step that acquires range information from the picked-up light; a geometric transformation step that performs geometric transformation for the intensity image, based on the range information; and an image extracting step that extracts differences between the intensity image subjected to the geometric transformation and an intensity image acquired in advance.

By providing a program in a computer-readable format, processing is performed on a compute system according to the program. By installing the computer program in the computer system, cooperative operations are delivered on the computer system and the same effect as other aspects of the present invention can be obtained.

Characteristics and advantages of the present invention will become apparent by more detailed descriptions based on embodiments of the present invention described later and the accompanying drawings.

BRIEF DESCRIPTION OF THE DRAWINGS

Preferred embodiments of the present invention will be described in detail based on the followings, wherein:

FIGS. 17A to 17E are drawings showing a processing embodiment in the image processing apparatus of the present invention;

FIG. 21 is a drawing showing a document format applicable to the second embodiment example of the image processing apparatus of the present invention;

FIG. 24 is a drawing showing a data output example in the second embodiment example of the image processing apparatus of the present invention;

FIG. 25 is a drawing showing a data processing example in the second embodiment example of the image processing apparatus of the present invention;

DESCRIPTION OF THE PREFERRED EMBODIMENTS

Figure 1:
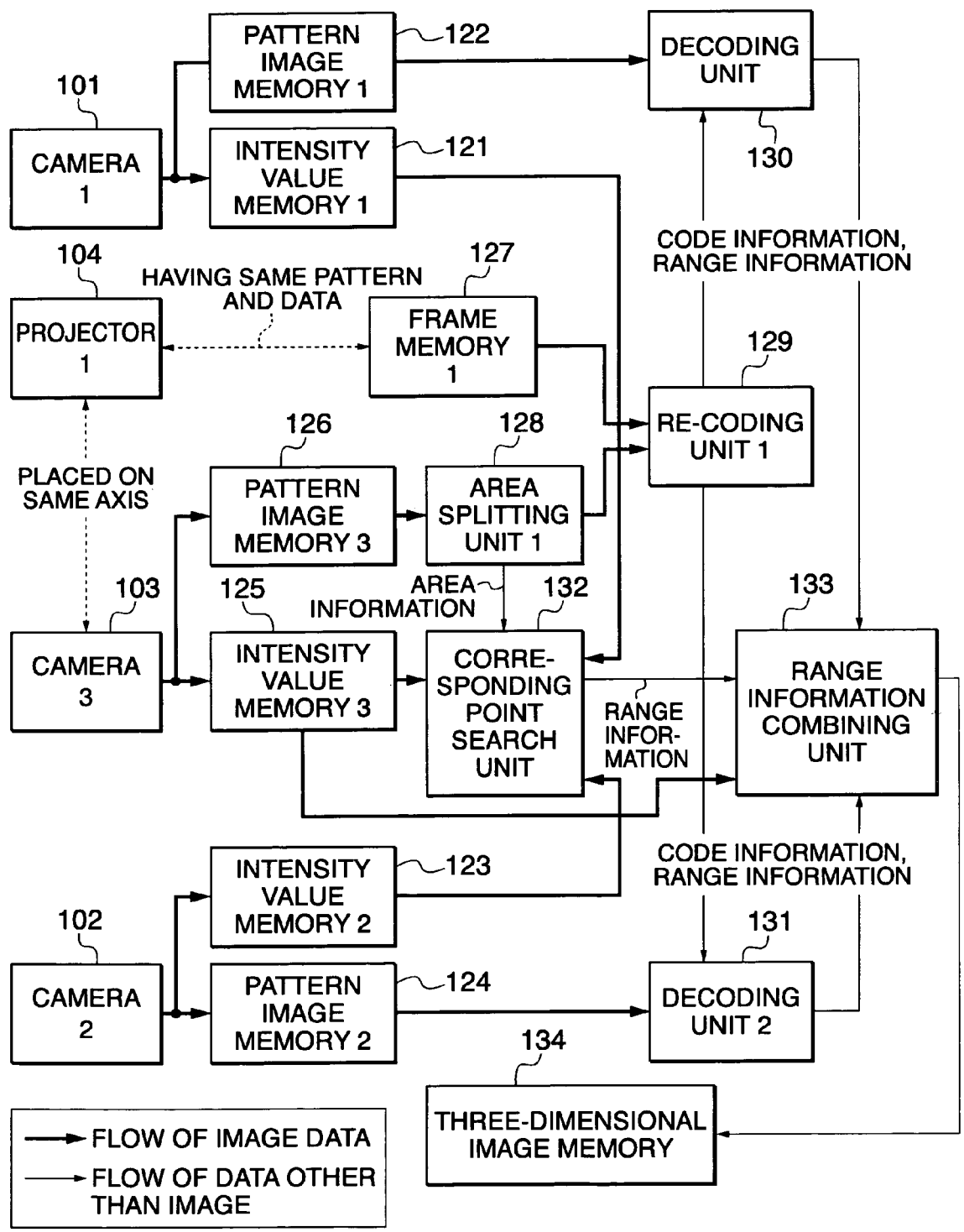
FIG. 1 is a block diagram showing a configuration of a three-dimensional shape measuring apparatus of the present invention.

The present invention has been made in view of the above circumstances and provides an image processing apparatus and an image processing method that perform distance measurement with a simple construction, gets an intensity image used as a so-called actual image and an image for distance measurement in parallel, and identifies input characters by an intensity image analysis based on range information.

According to an aspect of the present invention, the image processing apparatus has: a three-dimensional image pickup part that includes a projecting part that projects patterns, a first image pickup part that picks up an intensity image and a projection pattern image from the direction of an optical axis of the projecting part, and a second image pickup part that picks up the projection pattern image from a direction different from the optical axis of the projecting part. First range information is created based on a pattern picked up by the second image pickup part and a geometric transformation part that performs geometric transformation for the intensity image picked up by the first image pick up art based on the range information.

Furthermore, in the image processing apparatus of the present invention, for areas where the amount of change of the picked-up pattern by the first image pickup part with respect to the projection pattern is equal to or greater than a predetermined value, new codes corresponding to the picked-up pattern by the first image pickup part may be assigned, and the first range information may be created from the picked-up pattern by the second image pickup part, based on the new codes.

Furthermore, the image processing apparatus may further have: a frame data comparison part that makes comparisons between frame data images picked up in a time-series by the three-dimensional image pickup part: and an image processing part that eliminates noise data from the frame data images based on a result of making comparisons between the frame data images in the frame data comparison part.

Furthermore, the image processing apparatus may further have: a frame data comparison part that makes comparisons between frame data images picked up in a time-series by the three-dimensional image pickup part; and an image processing part that modifies image positions of the frame data images based on a result of making comparisons between the frame data images in the frame data comparison part.

Furthermore, the image processing apparatus may further have: a storage part that stores, as initial frame data, an initial image of frame data picked up in a time-series by the three-dimensional image pickup part; a frame data comparison part that makes comparisons between frame data images picked up in a time-series by the three-dimensional image pickup part; and an image processing part that extracts only differential data as storage data, based on a result of comparing, in the frame data comparison part, the initial frame data with frame data subsequently picked up.

Furthermore, in the image processing apparatus of the present invention, the projecting part may have a light source to emit light of an invisible region; and the first and second image pickup parts may have a filter for transmitting light of an invisible region and a filter for cutting off light of an invisible region, and may pick up pattern projection images and intensity images in parallel.

Furthermore, in the image processing apparatus of the present invention, for areas where the amount of change of the picked-up pattern by the first image pickup part with respect to the projection pattern by the projecting part is less than a predetermined value, second range information may be created by bringing the areas into correspondences with respective pieces of intensity information obtained by the first and second image pickup parts.

Furthermore, in the image processing apparatus of the present invention, the second image pickup part may include plural image pickup parts that pick up the measurement target at different angles, and range information may be created based on projection patterns respectively picked up by the plural image pickup parts.

Furthermore, according to another aspect of the present invention, the image processing method includes: a projecting step that projects patterns by a projecting part; an image pickup step that picks up an intensity image and a projection pattern image by a first image pickup part from an optical axis direction of the projecting part, and picks up the projection pattern image by a second image pickup part from a direction different from the optical axis direction of the projecting part; a range information creation step that creates first range information, based on a picked-up pattern picked up by the second image pickup part: and a geometric transformation step that performs geometric transformation for the intensity image produced by the first image pickup part, based on the range information.

Furthermore, in the image processing method of the present invention, the range information creation step may include the step of: for areas where the amount of change of the picked-up pattern by the first image pickup part with respect to the projection pattern is equal to or greater than a predetermined value, assigning new codes corresponding to the picked-up pattern by the first image pick up art, and creating the first range information from the picked-up pattern by the second image pickup part, based on the new codes.

Furthermore, the image processing method may further include: a frame data comparison step that makes comparisons between frame data images picked up in a time-series in the image pickup step; and an image processing step that eliminates noise data from the frame data images, based on a result of making comparisons between the frame data images in the frame data comparison step.

Furthermore, the image processing method may further include: the frame data comparison step that makes comparisons between frame data images picked up in a time-series in the image pickup step; and an image processing step that modifies image positions of the frame data images, based on a result of making comparisons between the frame data images in the frame data comparison step.

Furthermore, the image processing method may further include: a storage step that stores an initial image of frame data picked up in a time-series in the image pickup step in a storage part as initial frame data; a frame data companion step that makes comparisons between frame data images picked up in a time-series in the image pickup step; and an image processing step that extracts only differential data as storage data, based on a result of comparing, in the frame data comparison step, the initial frame data and frame data got subsequently.

Furthermore, in the image processing method of the present invention, the pattern projecting step may use the light source as an invisible-region light source using infrared or ultraviolet light, and may form pattern light by invisible-region light; and the image pickup step may pick up pattern projection images and intensity images in parallel.

Furthermore, in the image processing method of the present invention, for areas where the amount of change of the picked-up pattern by the first image pickup part with respect to the projection pattern by the projecting part is less than a predetermined value, second range information may be created by bringing the areas into correspondences with respective pieces of intensity information obtained by the first and second image pickup parts.

Furthermore, in the image processing method of the present invention, the second image pickup part may include plural image pickup parts that pick up the measurement target at different angles, and the method may include the step of creating range information, based on projection patterns respectively picked up by the plural image pickup parts.

According to another aspect of the present invention, the image processing apparatus includes: a projecting part that projects light to an image holding medium to form an image thereon; an image pickup part that picks up the image formed on the image holding medium; an intensity image acquisition part that acquires an intensity image, based on the image picked up in the image pickup part; a range information acquisition part that acquires range information from the picked-up image; a geometric transformation part that performs geometric transformation for the intensity image, based on the range information acquired in the range information acquisition part; and an image extracting part that extracts differences between the geometric-transformed intensity image and the intensity image acquired in advance.

Furthermore, in the image processing apparatus of the present invention, the image holding medium is one of a manuscript sheet, whiteboard, blackboard, screen, wall, and screen projection sheet.

Furthermore, in the image processing apparatus of the present invention, the intensity image acquired in advance as a processing target in the image extracting part may be a preceding frame image inputted precedent to the geometric transformation part.

Furthermore, in the image processing apparatus of the present invention, the intensity image acquired in advance as a processing target in the image extracting part may be image data stored in advance in the storage part.

Furthermore, the image processing apparatus may include: a document database in which plural pieces of document format data are stored; and a document identifying part that performs matching between the geometric-transformed intensity image and format images stored in the document database. The image extracting part may extract differences between the geometric-transformed intensity image and format images stored in the document database.

Furthermore, the image processing apparatus may further have a character transformation processing construction that reads character data extracted by the image extracting part and transforms it to character data replaceable as code values.

Furthermore, the image processing apparatus may further include: an authentication information database in which handwriting history data of registered users is stored; and an authentication processing part that inputs the geometric-transformed intensity image and performs matching between the input image and handwriting history data stored in the authentication information database.

Furthermore, in the image processing apparatus of the present invention, the authentication information database may store handwriting history data and signature shape data of registered users; and the authentication processing part may input the geometric-transformed intensity image, and performs matching between the input image and the handwriting history data stored in the authentication information database, and between the input image and the signature shape data.

Furthermore, the image processing apparatus may further include a display part that displays an image produced as a result of performing geometric transformation for the intensity image, based on the range information in the geometric transformation part.

Furthermore, in the image processing apparatus of the present invention, a distance between an image holding medium and the image pickup part may be fixed; the image processing apparatus may include a storage part that stores range information acquired by the range information acquisition part; and the geometric transformation part performs geometric transformation for the intensity image, based on the range information stored in the storage part.

Furthermore, according to another aspect of the present invention, the image processing method includes: a projecting step that projects light to an image holding medium to form an image thereon; an image pickup step that picks up the image formed on the image holding medium; an intensity image acquisition step that acquires an intensity image, based on the image picked up in the image pickup step; a range information acquisition step that acquires range information from the picked-up image; a geometric transformation step that performs geometric transformation for the intensity image, based on the range information acquired in the range information acquisition step; and an image extracting step that extracts differences between the geometric-transformed intensity image and the intensity image acquired in advance.

Furthermore, in the image processing method of the present invention, the image holding medium is one of a manuscript sheet, whiteboard, blackboard, screen, wall, and screen projection sheet.

Furthermore, in the image processing method of the present invention, the intensity image acquired in advance as a processing target in the image extracting step may be a preceding frame image inputted precedent to the geometric transformation step.

Furthermore, in the image processing method of the present invention, the intensity image acquired in advance as a processing target in the image extracting step may be image data stored in advance in the storage part.

Furthermore, the method may further include: a document identifying step that performs matching between the geometric-transformed intensity image and format images stored in the document database in which plural pieces of document format data are stored. The image extracting step may extract differences between the geometric-transformed intensity image and format images stored in the document database.

Furthermore, the method may further have a character transformation processing step that reads character data extracted in the image extracting step and transforms it to character data replaceable as code values.

Furthermore, the method may include: an authentication processing step that inputs the geometric-transformed intensity image and performs matching between the input image and handwriting history data stored in the authentication information database in which handwriting history data of registered users is stored.

Furthermore, in the image processing apparatus of the present invention, the authentication information database may store handwriting history data and signature shape data of registered users; and the authentication processing step may input the geometric-transformed intensity image, and performs matching between the input image and the handwriting history data stored in the authentication information database, and between the input image and the signature shape data.

Furthermore, the method may further include a display step that displays an image produced as a result of performing geometric transformation for the intensity image, based on the range information in the geometric transformation step.

Furthermore, in the image processing method of the present invention, a distance between an image holding medium and the image pickup part may be fixed; the image processing method may include a storage step that stores range information acquired by the range information acquisition part; and the geometric transformation step performs geometric transformation for the intensity image, based on the range information stored in the storage step.

Furthermore, according to another aspect of the present invention, a storage medium readable by a computer, which stores a program of instructions executable by the computer to perform method steps for performing image processing is provided. The method includes the steps of: projecting light to an image holding medium to form an image thereon; picking up the image formed on the image holding medium; acquiring an intensity image based on the image picked up in the image pickup step; acquiring range information from the picked-up image; performing geometric transformation for the intensity image based on the range information acquired in the range information acquisition step; and extracting difference between the geometric-transformed intensity image and the intensity image acquired in advance.

Furthermore, according to another aspect of the present invention, an image processing apparatus includes: a projecting part that projects light; an image pickup part that picks up the projected light; an intensity image acquisition part that acquires an intensity image from the picked-up light; a range information acquisition part that acquires range information from the picked-up light; a geometric transformation part that performs geometric transformation for the intensity image, based on the range information; and an image extracting part that extracts differences between the intensity image subjected to the geometric transformation and an intensity image acquired in advance.

Furthermore, according to another aspect of the present invention, an image processing method includes: a projecting step that projects light; an image pickup step that picks up the projected light; an intensity image acquisition step that acquires an intensity image from the picked-up light; a range information acquisition step that acquires range information from the picked-up light; a geometric transformation step that performs geometric transformation for the intensity image, based on the range information; and an image extracting step that extracts differences between the intensity image subjected to the geometric transformation and an intensity image acquired in advance.

Furthermore, according to another aspect of the present invention, a storage medium readable by a computer, which stores a program of instructions executable by the computer to perform method steps for performing image processing is provided. The method includes the steps of: a projecting step that projects light; an image pickup step that picks up the projected light; an intensity image acquisition step that acquires an intensity image from the picked-up light; a range information acquisition step that acquires range information from the picked-up light; a geometric transformation step that performs geometric transformation for the intensity image, based on the range information; and an image extracting step that extracts differences between the intensity image subjected to the geometric transformation and an intensity image acquired in advance.

By providing a program in a computer-readable format, processing is performed on a compute system according to the program. By installing the computer program in the computer system, cooperative operations are delivered on the computer system and the same effect as other aspects of the present invention can be obtained.

Hereinafter, embodiments of an image processing apparatus and an image processing method of the present invention will be described in detail with reference to the accompanying drawings.

The image processing apparatus of the present invention acquires range information of a subject to be picked up, using images picked up from different directions, obtains range information of the subject, based on the acquired range information, and reads characters and the like within the image, by an intensity image as a picked-up image, based on the obtained range information.

Methods of acquiring three-dimensional shapes as range information include an active vision method and a passive vision method. The active vision method includes: (1) a laser method by which depth information is extracted by emitting laser beam, ultrasound, and the like to measure the amount of light reflected from a target and the length of time they reach the target; (2) a pattern projection method by which special pattern light sources such as slit light are used to estimate the shape of a target from image information such as geometric deformations of surface patterns of the target; and (3) a method by which contour lines are formed using moire stripes by optical processing to obtain three-dimensional information. On the other hand, the passive vision method includes a monocular stereo method by which three-dimensional information is estimated from one image by using knowledge on target appearance, light source, illumination, shade information, etc., and a stereoscopic method by which depth information of each pixel is estimated on triangulation principle.

Generally, although the active method is higher in measurement accuracy, a measurable range is, in many cases, smaller because of the limit of a projecting part. On the other hand, the passive method is versatile and has no restrictions on targets. The present invention relates to the pattern projection method of the active vision method applied to a three-dimensional measuring apparatus. The pattern projection method projects reference pattern light to a target and picks it up from a direction different from the direction in which the reference pattern light is projected. The picked-up pattern is deformed depending on the shape of the target. The target can be three-dimensionally measured by taking correspondences between the observed deformed pattern and the projected pattern. The pattern projection method has the problem of how correspondences between a deformed pattern and a projected pattern are easily taken with minimum erroneous correspondences. Accordingly, various pattern projection methods (space pattern coding, moire, and color encoding) are proposed.

A typical example of space coding includes: a lens system that shapes, e.g., a laser beam source and laser beam into a slit shape; a scanning device that scans and applies the shaped laser beam to a target; a camera that detects light reflected from the target; and a device that controls these components. By laser beam scanned from the scanning device, stripes having portions irradiated with the laser beam and portions not irradiated with the laser beam are formed on the target. Applying laser beam by plural patterns would cause the target surface to be split into N identifiable portions. By determining in which of the split portions each pixel on images produced by the cameras is contained, the shape of the target can be calculated.

To increase resolution requires plural laser scanning operations and plural camera image pickup operations. For example, to split a screen to 256 areas, eight image pickup operations are required. For this reason, since it is difficult to pick up fast moving objects and an image pickup system must be firmly secured during scanning, it is difficult to easily perform image pickup even if the device itself becomes compact.

A space pattern coding method is available as a method for easily restoring slits and projecting coded patterns by one operation. According to this method, three types or more of halftone areas are provided by tones of three values or more, three colors or more, or combinations of tones and colors; there is provided a multi-value grid plate having such a placement that at least three types of halftone areas contact with each other at intersects of the boundary lines of the halftone areas; to intersections of a projection image produced as a result of projecting the pattern to a measurement target, main codes corresponding to the type and order of halftone areas contacting at the intersects are assigned; and the main codes or codes having a combination of main codes of intersections and main codes of their surrounding intersections are assigned as characteristic codes for identifying intersections. However, with this method, codes may not be assigned depending on a target to be picked up, and correspondences between codes may not be established.

In Japanese Published Unexamined Patent Applications Nos. 2000-9442 and 2000-65542, there is proposed a three-dimensional image pickup apparatus that measures three-dimensional shapes independently of targets by feeding back projected patterns and generating new codes. The three-dimensional image pickup apparatus projects a projection pattern coded by plural levels of strength and plural wavelengths. In this case, the projection pattern is affected by the intensity information, material, and the like of a subject, with the result that an error occurs in the calculation of three-dimensional shapes, and the three-dimensional shapes cannot be correctly measured. Hence, the three-dimensional image pickup apparatus places a projection pattern in the same optical axis as a projecting element, monitors changes of the projection pattern by subject information, performs re-coding, and measures three-dimensional shapes.

Figure 2:
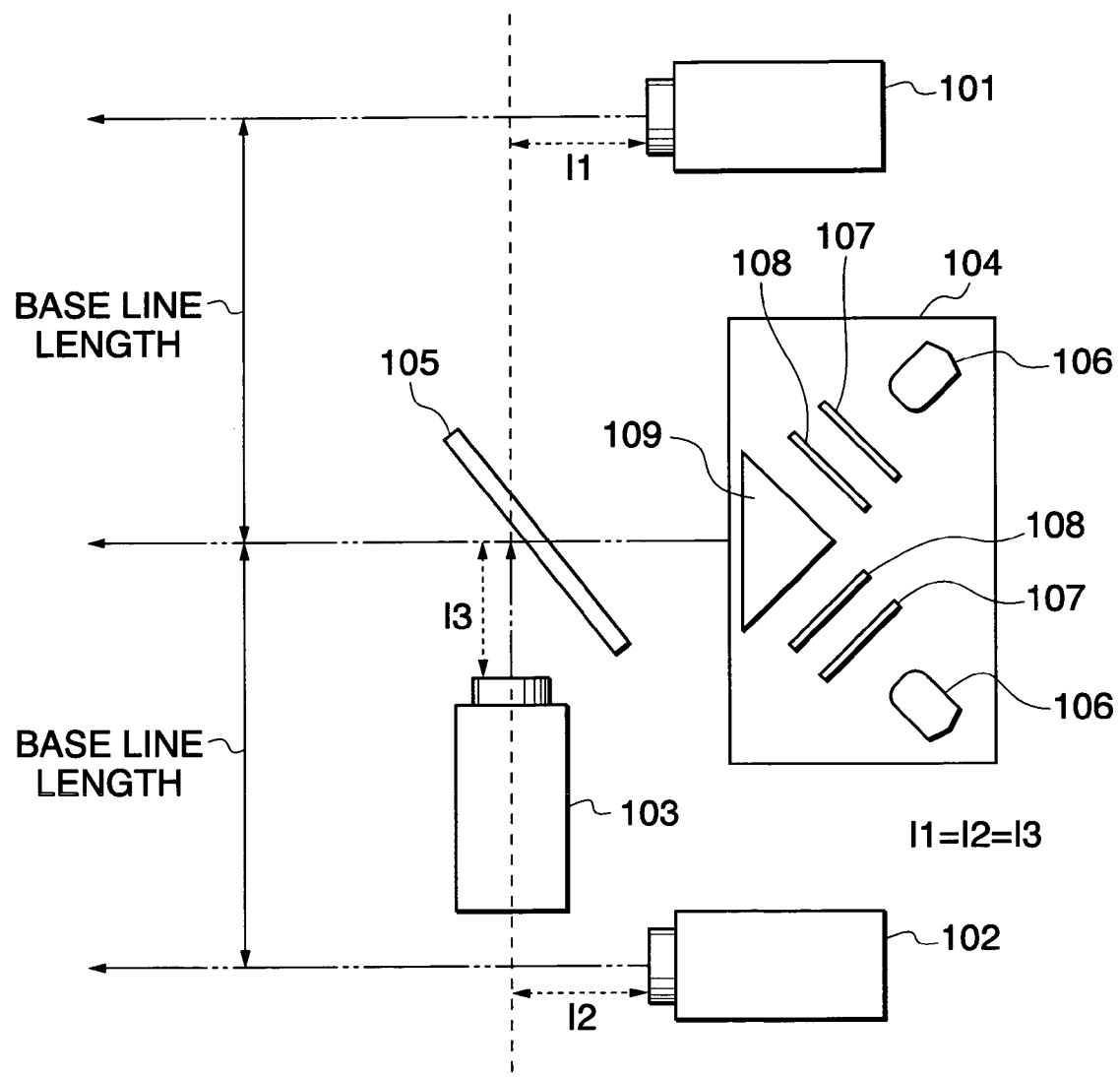
FIG. 2 is a block diagram showing a camera configuration of the three-dimensional shape measuring apparatus used in the image processing apparatus of the present invention.

First, a description will be made of the principle of obtaining distance data by use of re-coding processing. FIG. 1 is a block diagram showing the configuration of a three-dimensional image pickup apparatus that obtains distance data by re-coding processing. FIG. 2 shows a positional relationship among light sources and image pickup elements.

As shown in FIG. 2, a three-dimensional shape measuring apparatus includes three cameras 101 to 103 and a projector 104. To harmonize a distance relationship among the cameras, distances l1, l2, and l3 shown in the drawing are set equal. The camera 3 (shown as 103 in the figure) and the projector 104 are placed so as to match in optical axis using a half mirror 105. The camera 1 (shown as 101 in the figure) and the camera 2 (shown as 102 in the figure) are placed at both sides of the camera 3 (103) and the projector 104 so as to differ from them in optical axis. The distance between a central optical axis and an optical axis at each side is base line length L.

Figure 3:
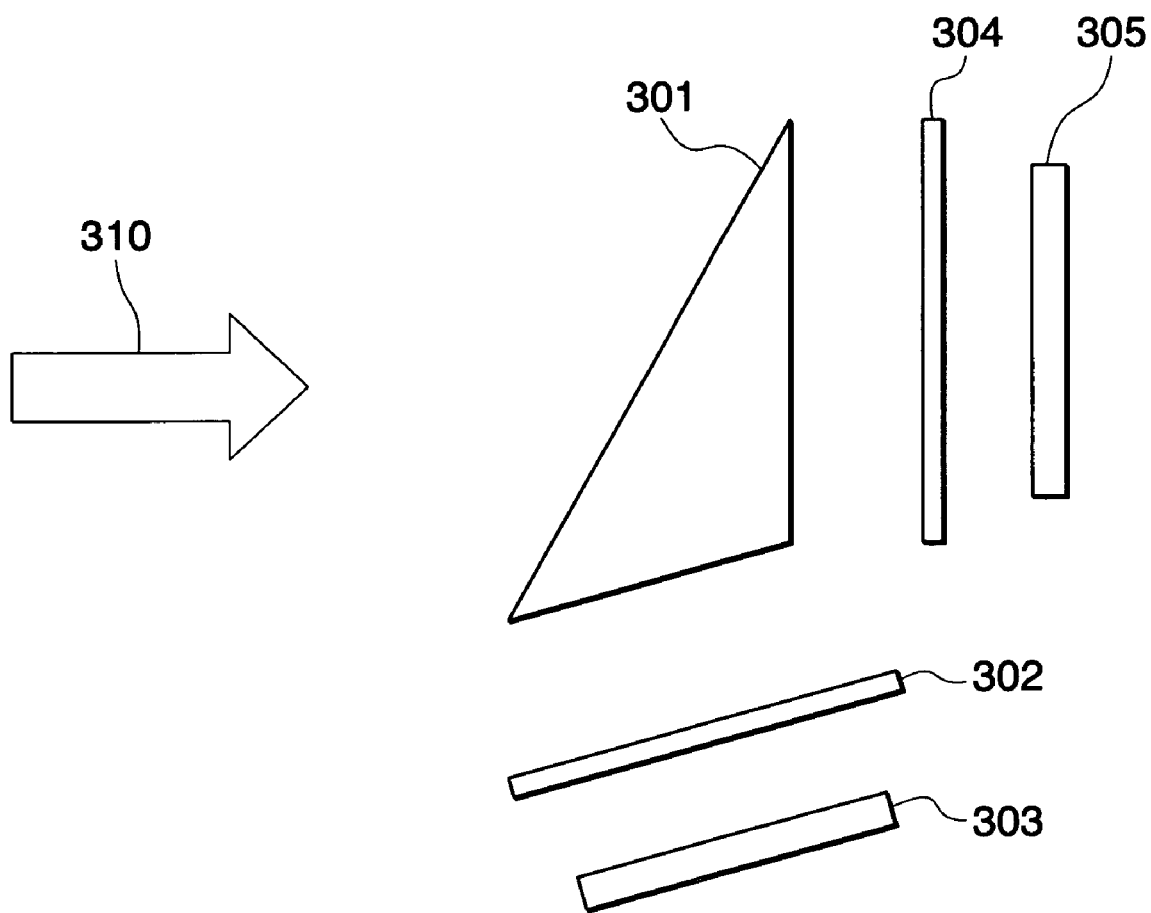
FIG. 3 is a drawing for explaining an image pickup configuration of the three-dimensional shape measuring apparatus used in the image processing apparatus of the present invention.

The projector 104 has a light source 106, mask patterns 107, strength patterns 108, and a prism 109. As the light source 106, an invisible-region light source using infrared or ultraviolet light can be employed. In this case, the cameras are configured as shown in FIG. 3. To be more specific, incident light 310 is divided to two directions by a prism 301, with one light entering an image pickup apparatus (e.g., CCD camera) 303 via an invisible-region (infrared or ultraviolet) transmission filter 302, and the other entering an image pickup apparatus 305 via an invisible-region (infrared or ultraviolet) cutoff filter 304.

As the light sources 106 shown in FIG. 2, light sources (whether visible region or invisible region) of wavelength band in which image pickup is possible may be used. In this case, as the camera 3 (shown as 103 in the figure), a CCD camera of progressive scan type is used, and the camera 1 (shown as 101 in the figure) and the camera 2 (shown as 102 in the figure) are not limited to a specific configuration. However, it is desirable to use a CCD camera of the same configuration in terms of match with the camera 3 (103). Patterns are projected from the light sources 106 and the three cameras 1 to 3 (101 to 103) perform image pickup at the same time. The cameras obtain light passing through the filters 302 and 304 (see FIG. 3) by the image pickup apparatuses 303 and 305, thereby obtaining images at a time.

The configuration of a three-dimensional shape measuring apparatus will be described using FIG. 1. The camera 1 (101) stores intensity information obtained by image pickup in an intensity value memory 121, and stores a picked-up pattern in a pattern image memory 122. Likewise, the camera 2 (102) stores intensity information in an intensity value memory 123 and stores a picked-up pattern in a pattern image memory 124. The camera 3 (103) stores intensity information in an intensity value memory 125 and stores a picked-up pattern in a pattern image memory 126. The projector 104 stores coded patterns created in advance in a frame memory 127 to refer to the patterns later, with each slit split into cells of square grid shape.

The stored picked-up patterns and intensity information are used to obtain a three-dimensional image as follows. The operations described below are common to both a combination of the camera 1 (101) and the camera 3 (103), and a combination of the camera 2 (102) and the camera 3 (103). Herein, a description will be made of an example of a combination of the camera 1 (101) and the camera 3 (103).

In FIG. 1, an area splitting part 128 splits a picked-up pattern obtained by the camera 3 (103) into areas. Areas that a strength difference between adjacent slit patterns is equal to or less than a threshold value are extracted as area 1 in which light from a projector does not arrive, and areas that a strength difference between adjacent slit patterns is greater than the threshold value are extracted as area 2. A re-coding part 129 performs recoding for the extracted area 2, using a picked-up pattern stored in the pattern image memory 126 and a picked-up pattern stored in the pattern image memory 127.

Figure 4:
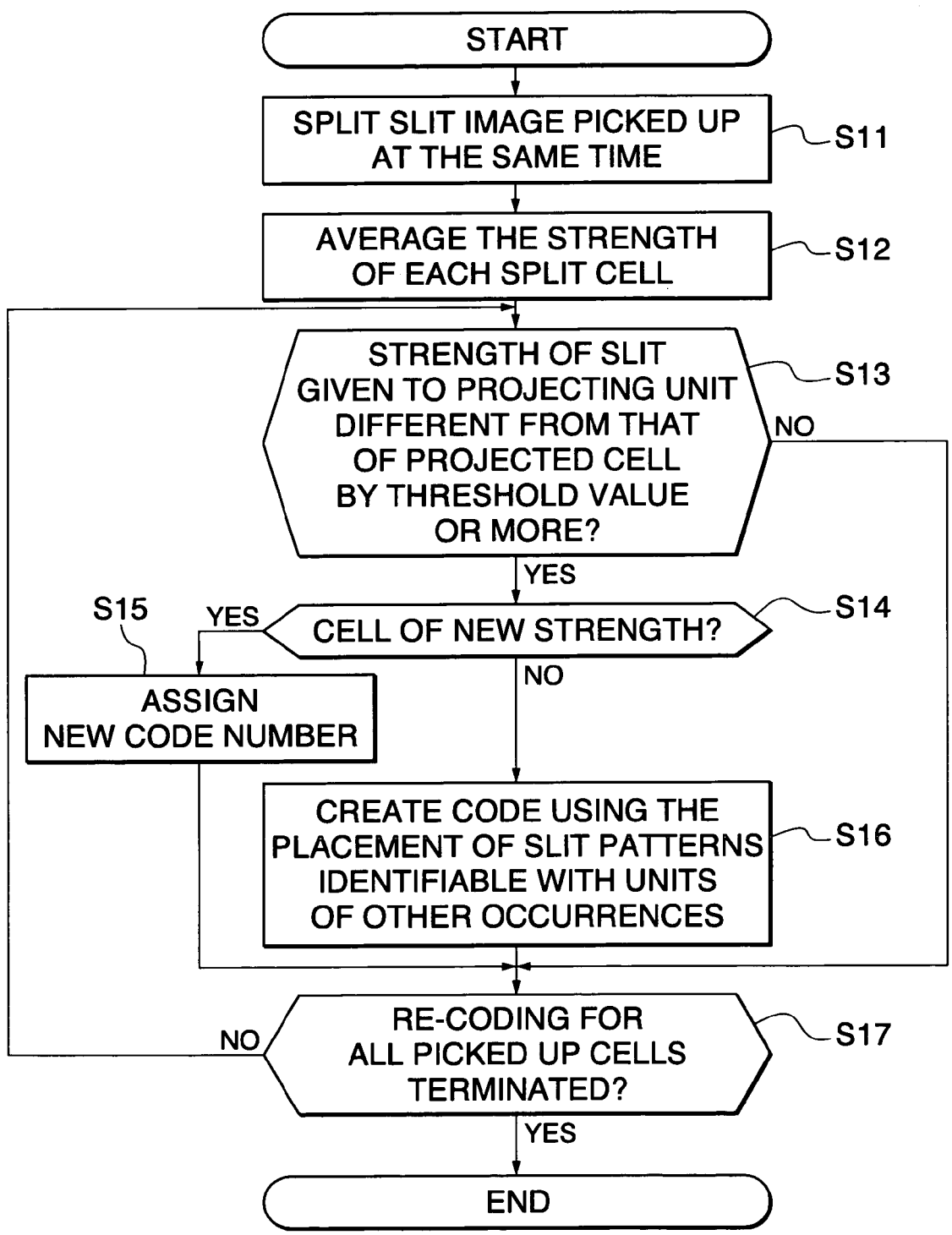
FIG. 4 is a drawing showing a processing flow of the three-dimensional shape measuring apparatus used in the image processing apparatus of the present invention.

FIG. 4 is a flowchart for re-coding. Each slit pattern is longitudinally split for each slit width (step S11) to create square cells. An average value of strength is taken for each of the created cells, and the average value is defined as the strength of the cell (step S12). Sequentially from the center of an image, the strengths of corresponding cells between a projection pattern and a pick-up pattern are compared, and it is judged whether a difference between the strengths of the cells is equal to or greater than a threshold value because the patterns change due to factors such as the reflectivity of an object and a distance from the object (step S13). Unless the difference is equal to or greater than a threshold value, re-coding for all picked-up cells terminates (step S17).

If the difference is equal to or greater than a threshold value, it is judged whether the cell is a cell of new strength (step S14). When the cell is a cell of new strength, a new code is created and allocated (step S15). When the cell is not a cell of new strength, a code is created using the placement of slit patterns identifiable with parts of other occurrences (step S16). This terminates re-coding (step S17).

Figure 5A:
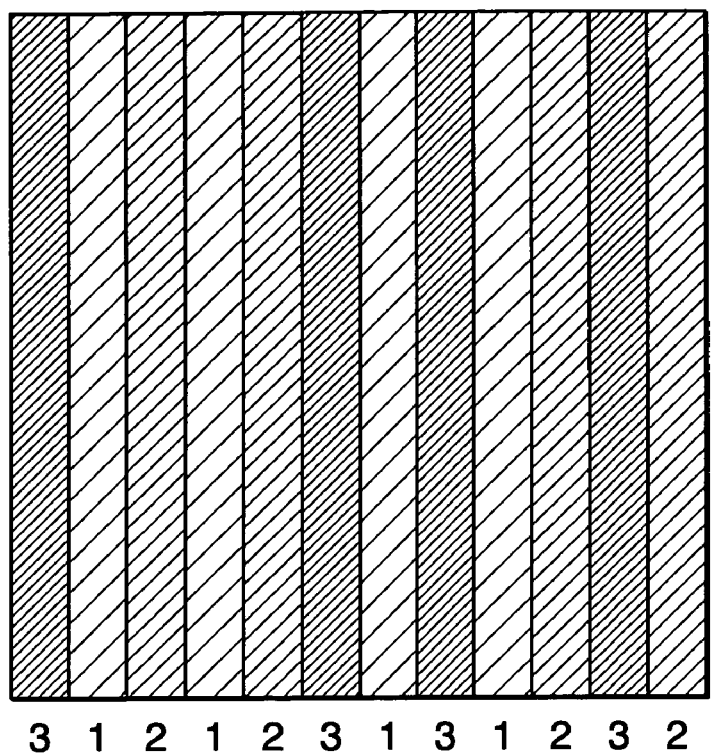
FIGS. 5A to 5C show an example of coding a projection pattern of the three-dimensional shape measuring apparatus used in the image processing apparatus of the present invention.
Figure 5B:
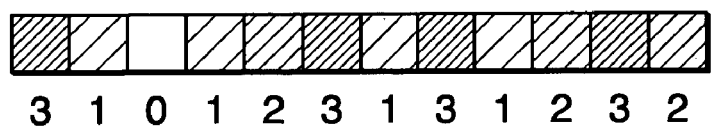
Figure 5C:
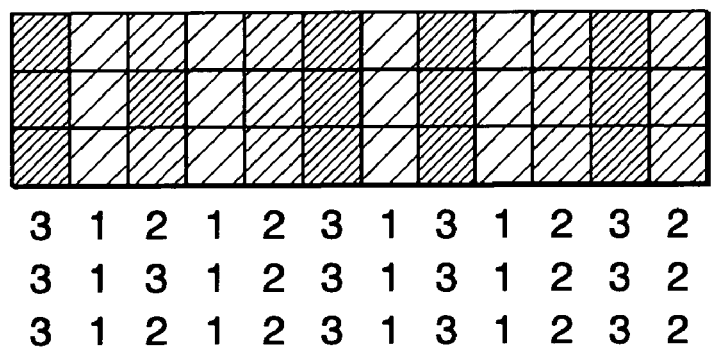

FIGS. 5A to 5C show an example of coding slit patterns, and FIG. 5A is a projection pattern coded by the placement of slits, with three levels of strength respectively assigned 3 (high), 2 (medium), and 1 (low). In FIG. 5B, since strength changes at the third cell from the left and a new code occurs, a code of 0 is newly assigned. In FIG. 5C, since an existing code occurs at the cell that is third from the left and second from the top, as recoding processing, judging from the placement of cells, new codes [232] and are assigned for the placement of vertical cells and the placement of horizontal cells, respectively. The re-coding processing is equivalent to the projection of complicated patterns such as two-dimensional patterns to varied parts of a target shape and the projection of simple patterns to unvaried parts. The re-coding processing is performed in a manner that repeats the process to assign unique codes to all cells.

Figure 6:
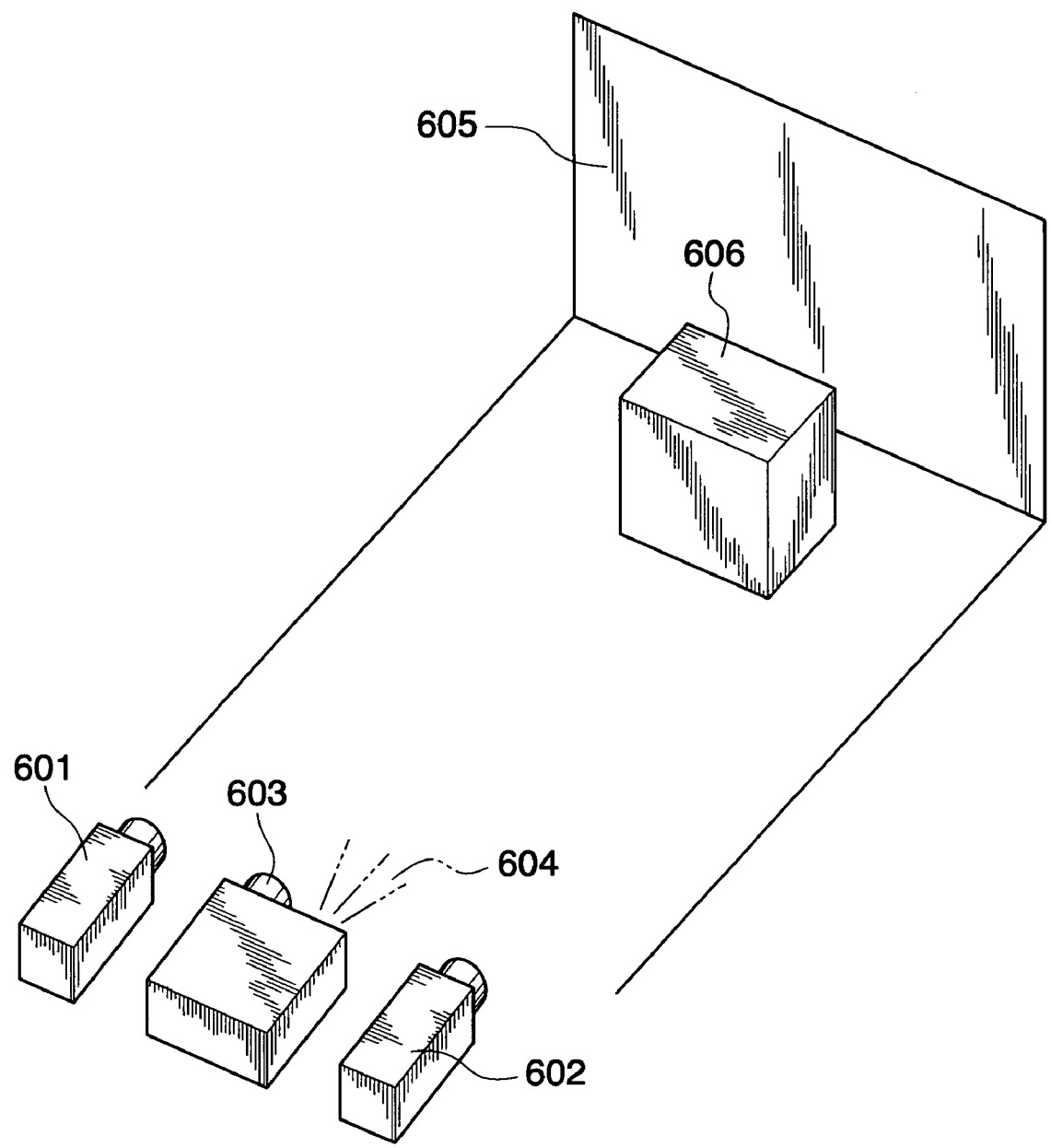
FIG. 6 is a drawing showing an image pickup configuration of the three-dimensional shape measuring apparatus used in the image processing apparatus of the present invention.
Figure 7:
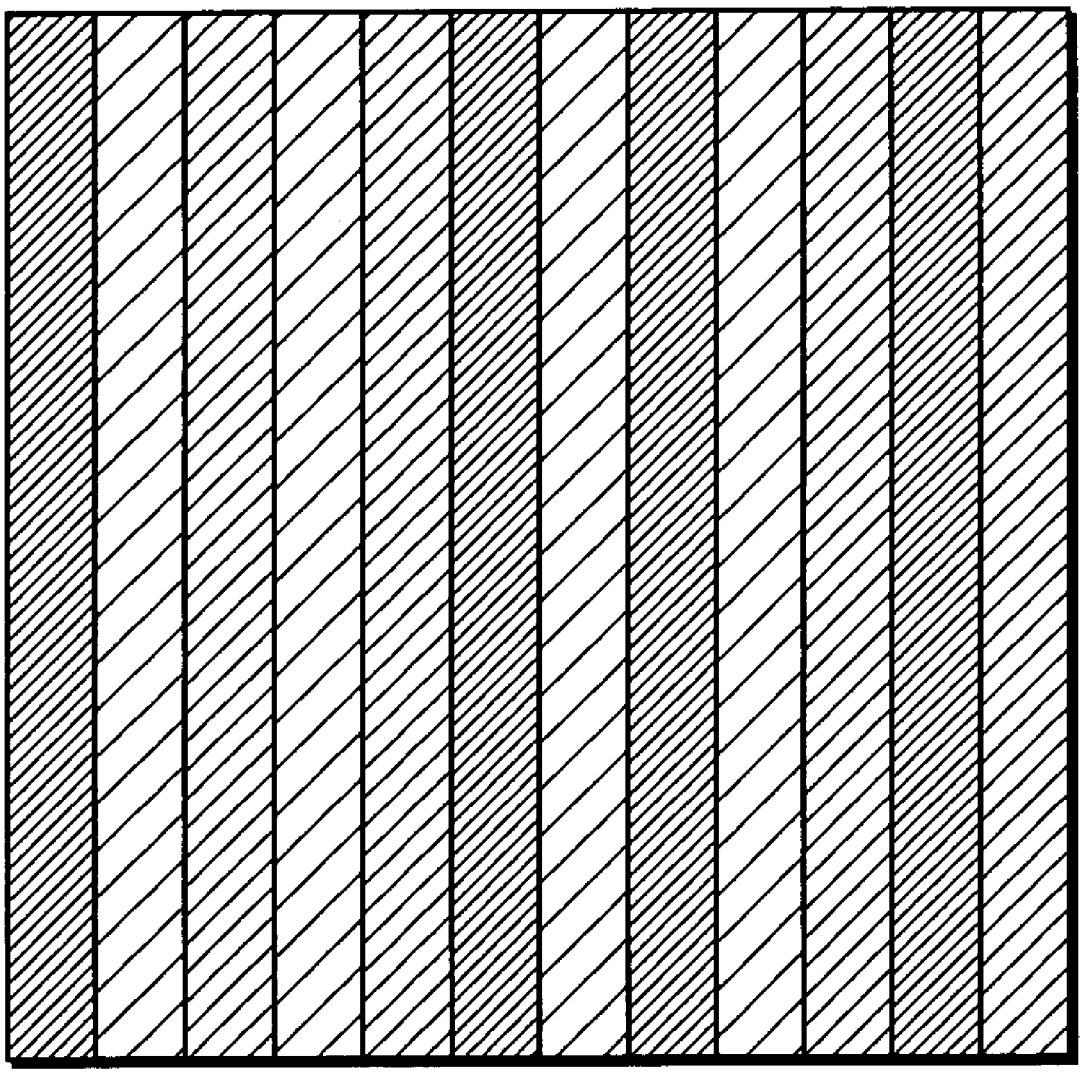
FIG. 7 is a drawing showing a projection pattern of the three-dimensional shape measuring apparatus used in the image processing apparatus of the present invention.
Figure 8:
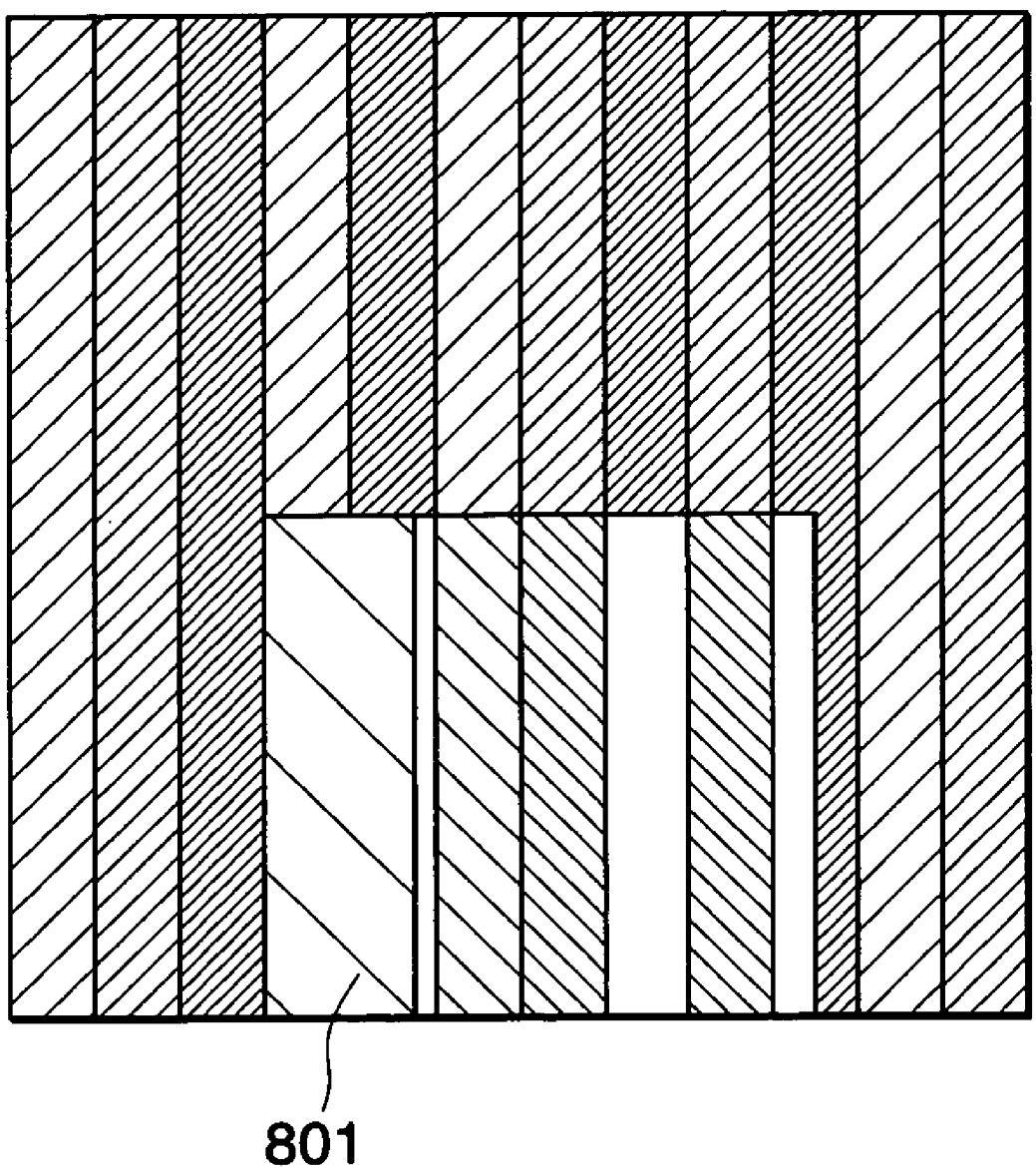
FIG. 8 is a drawing showing a slit pattern picked up by a camera 1 of the three-dimensional shape measuring apparatus used in the image processing apparatus of the present invention.
Figure 9:
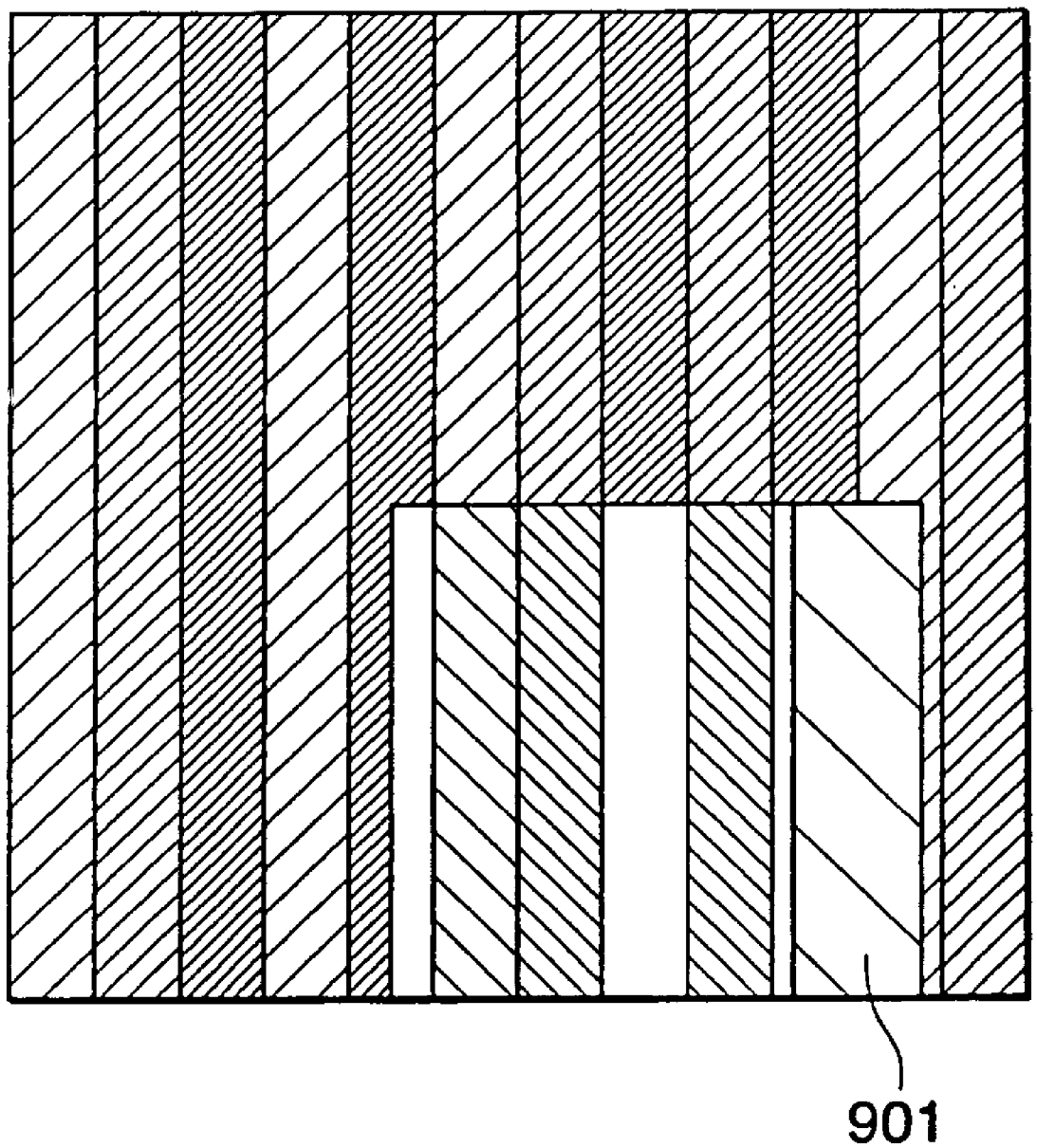
FIG. 9 is a drawing showing a slit pattern picked up by a camera 2 of the three-dimensional shape measuring apparatus used in the image processing apparatus of the present invention.
Figure 10:
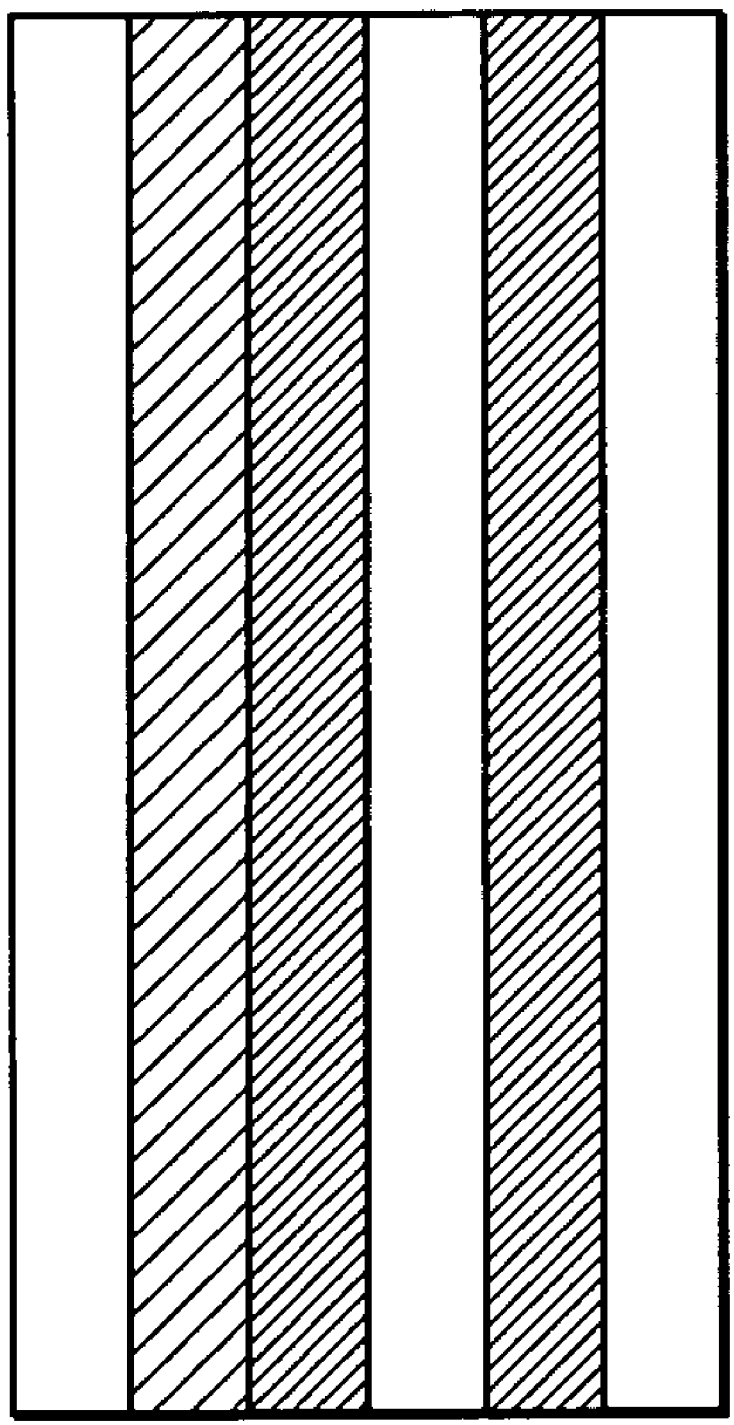
FIG. 10 is a drawing showing a slit pattern newly coded in the three-dimensional shape measuring apparatus used in the image processing apparatus of the present invention.

FIG. 6 shows an example of projecting a coded pattern to a board 606 in front of wall 605 by using cameras 601 to 603 and a projector 604. The coded pattern herein is a slit pattern shown in FIG. 7. Images obtained by the cameras 601 and 602 respectively have areas 801 and 901 shaded by the board 606, as shown in FIGS. 8 and 9. In this example, on the surface of the board 606 is obtained a slit pattern as shown in FIG. 10 as a pattern newly coded.

Figure 11:
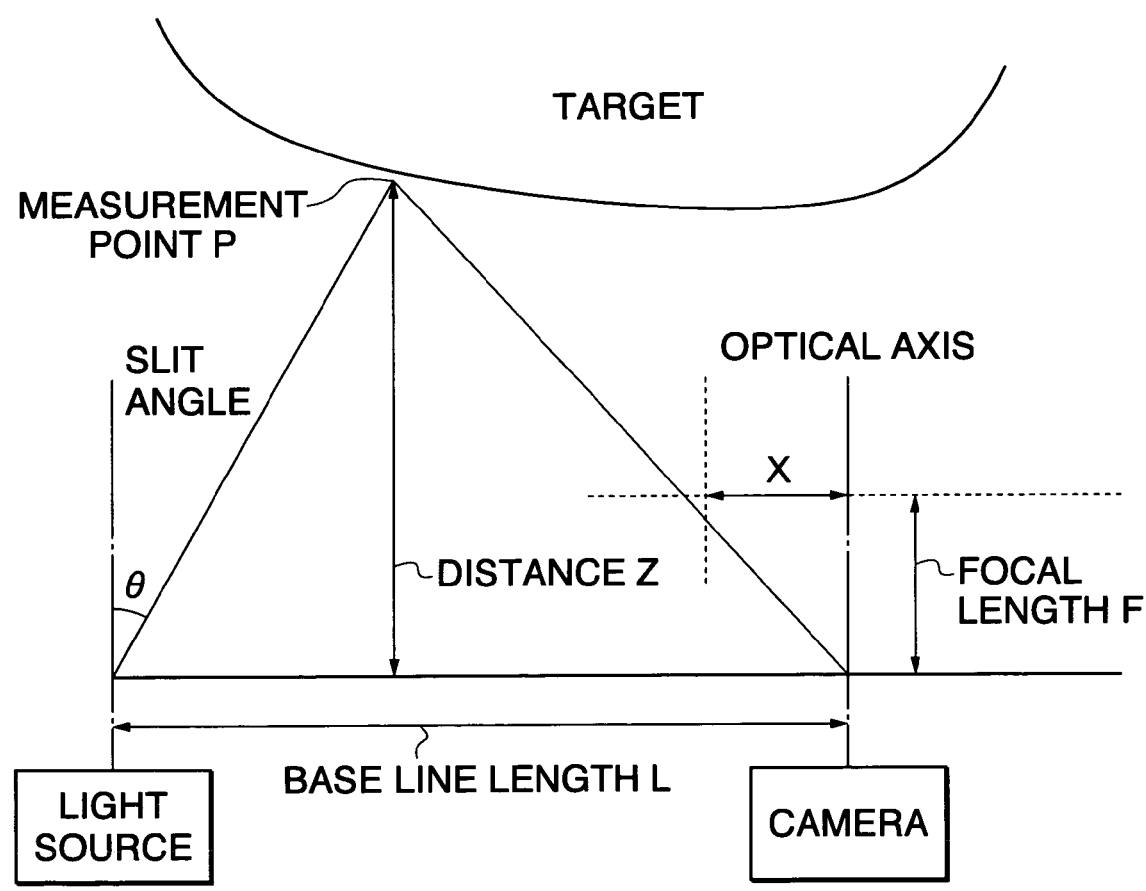
FIG. 11 is a drawing showing a method of calculating distances by a space coding method of the three-dimensional shape measuring apparatus used in the image processing apparatus of the present invention.

Referring back to FIG. 1, a decoding part 130 of the camera 1 (101) extracts the projection pattern from the pattern image memory 122 and splits it into cells in the same way as described above. The decoding part 130 detects the codes of cells using the codes created in the re-coding part 129, and calculates a slit angle θ from a light source, based on the detected codes. FIG. 11 is a drawing showing a method of calculating distances in space coding processing. Distance Z is calculated by the following expression 1 from the slit angle θ of a cell to which a pixel belongs, x coordinate on a image obtained by the camera 1, and focal length F and base line length L, which are camera parameters.

$Z=(F \times L)/(x+F \times \tan \theta)$ (Expression 1)

The calculation of the distance Z is also performed in the same way in a decoding part 131 of the camera 2 (102). In the above-described area 1, a distance is calculated in the following way. In the area 1, since pattern detection by a projected pattern is impossible, a corresponding point search part 132 detects a parallax using intensity information read from the intensity value memories 121, 123, and 125 of the cameras 1 to 3, and calculates a distance from the parallax. For areas other than area 1, since distances have been calculated by the above-described operation, a minimum value of distances of area 1 is obtained and pixels that can be made to correspond with are limited. Correspondences between pixels are taken using these limitations to detect a parallax d, and a distance Z is calculated by the following expression 2, using a pixel size λ, which is a camera parameter.

$Z=(L \times F)/(\lambda \times d)$ (Expression 2)

Figure 12:
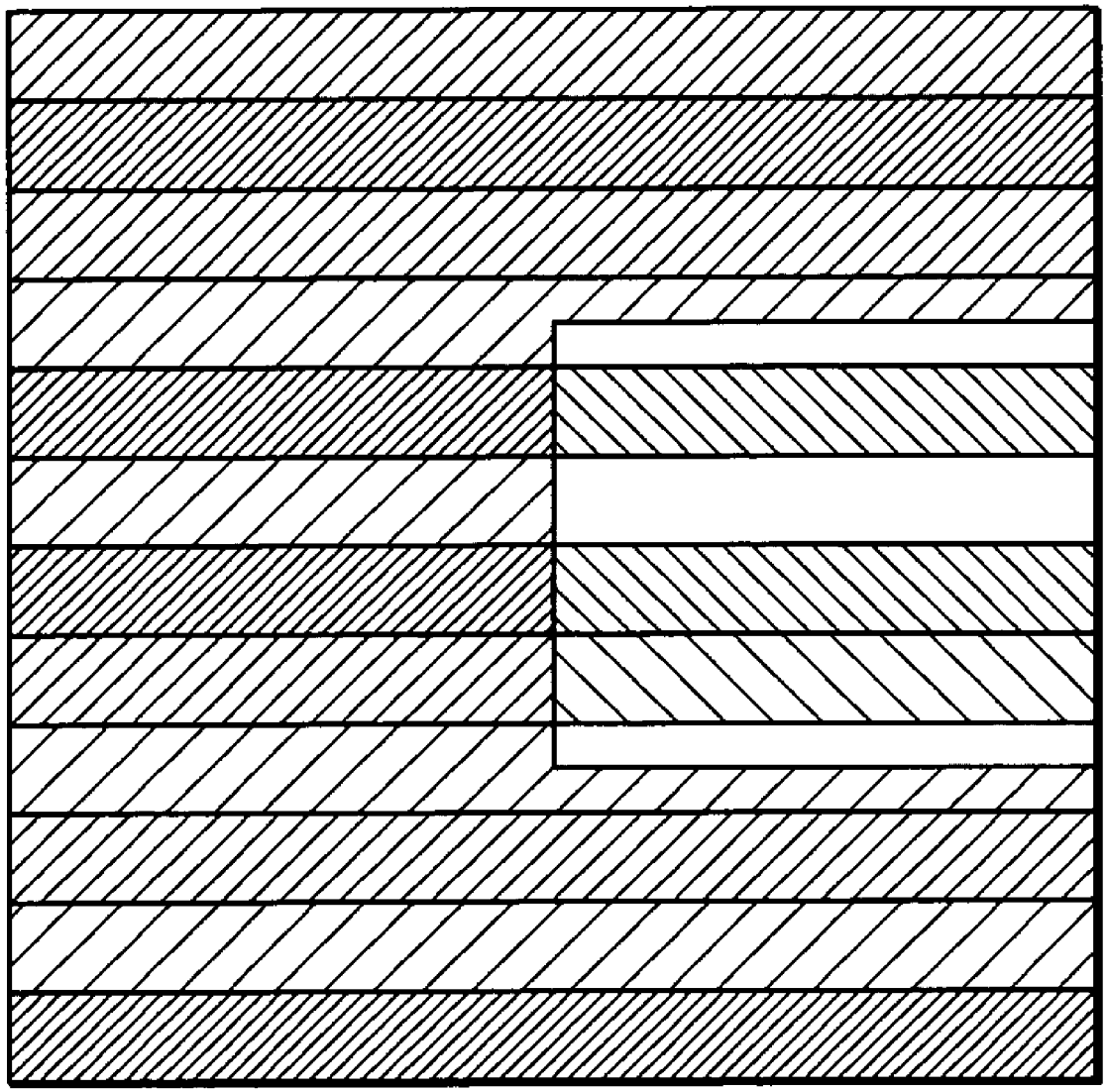
FIG. 12 is a drawing showing a slit pattern picked-up by a camera 3 of the three-dimensional shape measuring apparatus used in the image processing apparatus of the present invention.

The range information obtained by a combination of the camera 3 (103) and the camera 1 (101) by the foregoing method is not sufficient to detect range information of an area 801 shaded by the board as shown in FIG. 8. On the other hand, the range information obtained by a combination of the camera 3 (103) and the camera 2 (102) by the foregoing method is not sufficient to detect range information of an area 901 shaded by the board as shown in FIG. 9. However, range information of the area 801 shaded by the board as shown in FIG. 8 can be obtained. Hence, in a range information combining part 133 of FIG. 1, from the range information obtained by a combination of the camera 3 (103) and the camera 1 (101), and the range information obtained by a combination of the camera 3 (103) and the camera 2 (102), range information for all pixels of an image (FIG. 12) of the camera 3 is obtained. Three-dimensional image pickup is performed by storing the range information obtained by the above operations in a three-dimensional image memory in association with, e.g., an intensity image of the camera 3.

Range information can be obtained by the above-described configuration. An image processing apparatus of the present invention reads characters and the like within an image by an intensity image as a picked-up image, based on range information obtained by the above-described method.

Hereinafter, a description will be made of plural embodiment examples of an image processing apparatus that read characters and the like within an image by obtaining range information and intensity information.

Figure 13:
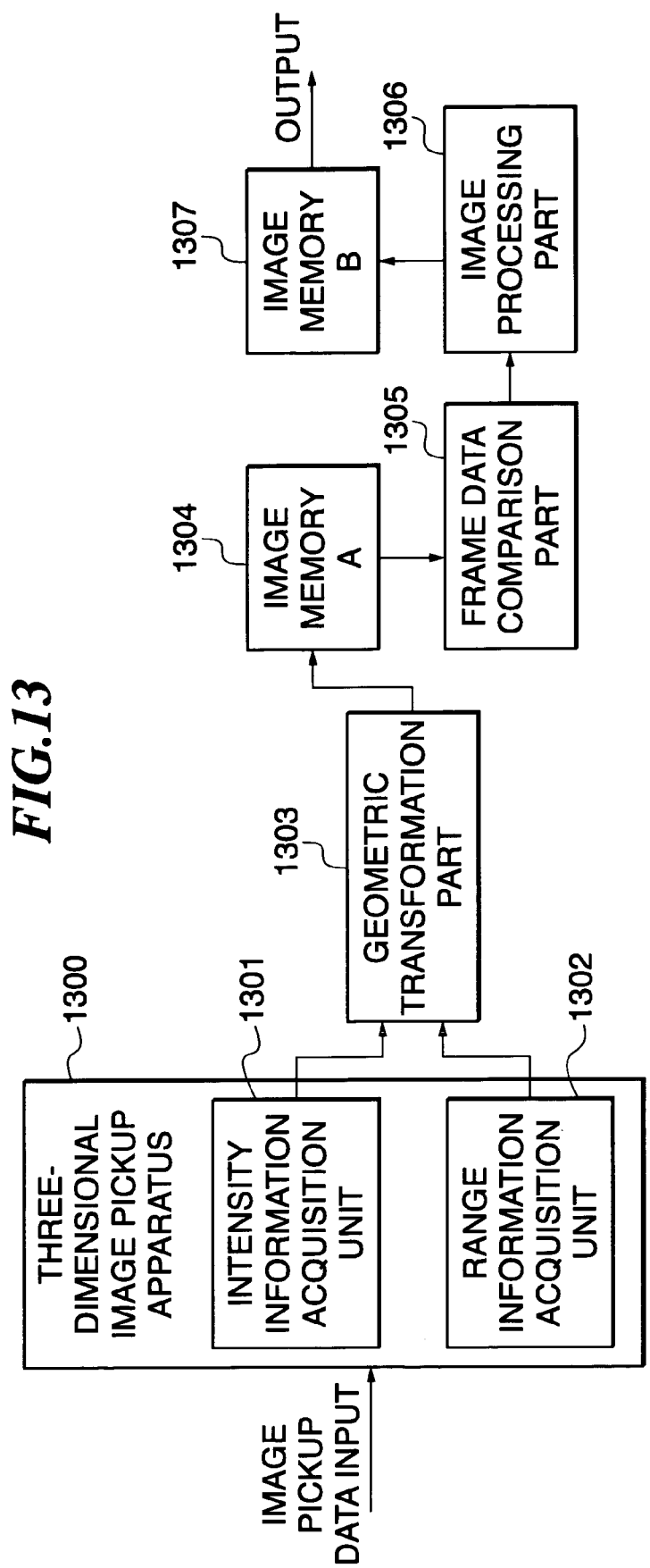
FIG. 13 is a block diagram showing a configuration of the image processing apparatus of the present invention.

First, a description will be made of the configuration of a first embodiment example that performs image reading. FIG. 13 is a block diagram showing an image processing apparatus of the first embodiment example. The image processing apparatus of this embodiment example includes: a three-dimensional image pickup apparatus 1300; a geometric transformation part 1303; an image memory A 1304; a frame data comparison part 1305; an image processing part 1306; and an image memory B 1307.

The three-dimensional image pickup apparatus 1300 has the above-described configuration of FIG. 1, and has a configuration to create accurate range information by, e.g., re-coding processing. As described above, the three-dimensional image pickup apparatus 1300, for example, has a range information acquisition unit 1302 for acquiring range information from pattern images, and an intensity information acquisition unit 1301 for acquiring intensity images as actual images other than patterns. As a range information acquisition processing configuration in embodiment examples described below, without being limited to a range information acquisition processing configuration by re-coding processing through projection of pattern light, other range information acquisition processing configurations may be applied.

The geometric transformation part 1303 performs geometric transformation for an intensity image acquired by the intensity information acquisition unit 1301, based on range information acquired by the range information acquisition unit 1302. The geometric transformation identifies plural points, e.g., endpoint positions on a manuscript as an image holding medium to be picked up, and adjusts the identified plural points so that they are placed at an equal distance from a camera serving as an image pickup part, that is, performs transformation into an image that would be obtained if the manuscript were picked up from the front thereof.

Intensity images transformed by the geometric transformation part 1303 are successively stored in the image memory A 1304 as time-series frame data. The frame data comparison part 1305 compares frame data stored in the image memory A 1304, and, for example, finds differential data of the images.

The image processing part 1306 retrieves only newly added data from data obtained as a result of frame data comparison processing by the frame data comparison part 1305, eliminates data judged as noise from data extending into plural frames, and stores data with unnecessary portions deleted, in the image memory B 1307.

Data stored in the image memory B 1307 is outputted to a display part such as a monitor, screen, whiteboard, printer, storage part, etc., as required.

A description will be made of processing by the image processing part 1306 and the frame data comparison part 1305. A user inputs the intention to start a handwritten input to a personal computer or the like. Next, the user decides a range of the handwritten input to start reading. In this case, where a manuscript as an image holding medium is empty, information of the manuscript onto which no information is written is stored in the image memory A 1304 as original data and initial frame data. For form data such as a table, its image is read as initial frame data.

When the user writes information with a pen or the like during image pickup operation by the three-dimensional image pickup apparatus 1300, the three-dimensional image pickup apparatus 1300 performs geometric transformation for an image and stores the transformed image in the image memory A 1304. The frame data comparison part 1305 functions as an image extracting part that compares preceding and following frames of stored data and obtains differential data. The image processing part 1306 stores information newly added to the initial frame data in the image memory B 1307.

In other words, for a medium to which information is added by handwriting or the like to an initial frame data image registered in advance, the image registered in advance is specified, then the specified image is read, a difference between images is found, and data newly added is read as new data.

When the user writes information with a pen or the like during image pickup operation by the three-dimensional image pickup apparatus 1300, the three-dimensional image pickup apparatus 1300 performs geometric transformation for an image and stores the transformed image in the image memory A 1304. The frame data comparison part 1305 compares preceding and following frames of stored data and obtains differential data. The image processing part 1306 stores only information newly added in the image memory B 1307.

The frame data comparison part 1305 compares images over several frames to determine whether the added information is information newly written with a pen, etc., or is not-written information such as a pen and user's hand, that is, noise. If it is judged that the added information is noise, the image processing part 1306 deletes the information and stores only newly written data in the image memory B 1307 as data. If data not appearing in the initial frame data appears continuously in frame data other than the initial frame data, the data is judged as noise data. Examples of such data include a pen and user's hand.

Figure 14B:
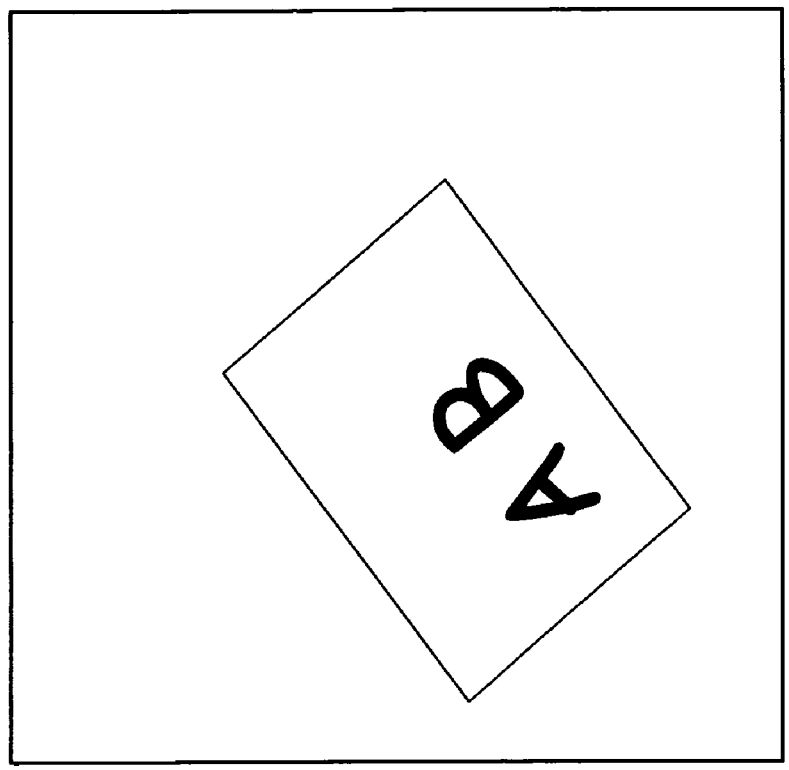
FIGS. 14A and 14B are drawings for explaining a concrete example of noise elimination processing in the image processing apparatus of the present invention.
Figure 14A:
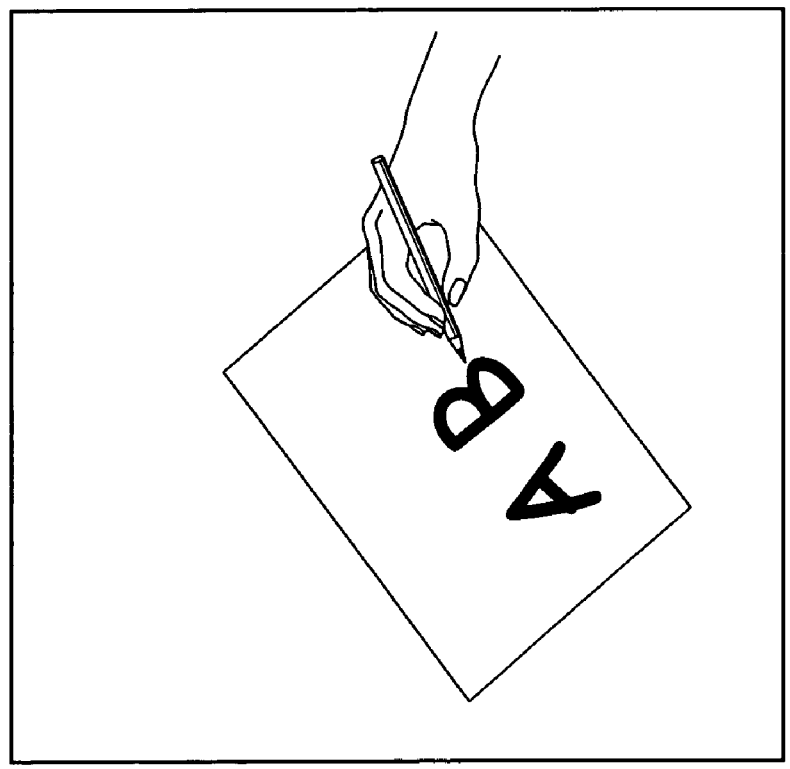

FIG. 14 shows a concrete example of the above-described noise information elimination processing. In FIG. 14A, the state in which handwritten characters are being written onto a manuscript such as paper is picked up by the three-dimensional image pickup apparatus 1300, and an obtained image is stored in the image memory A 1304 as one frame image data. The frame data comparison part 1305 judges a pen and user's hand as noise from the image data, the image processing part 1306 performs noise processing, and data shown in FIG. 14B is stored in the image memory B 1307.

Figure 15A:
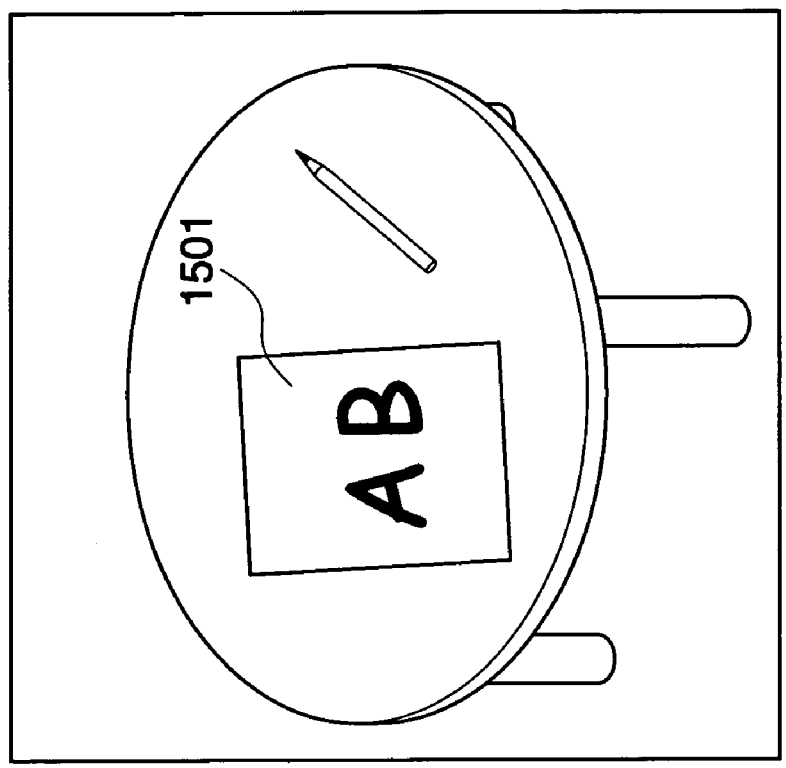
FIGS. 15A and 15B are drawings for explaining a concrete example of position correction processing in the image processing apparatus of the present invention.
Figure 15B:
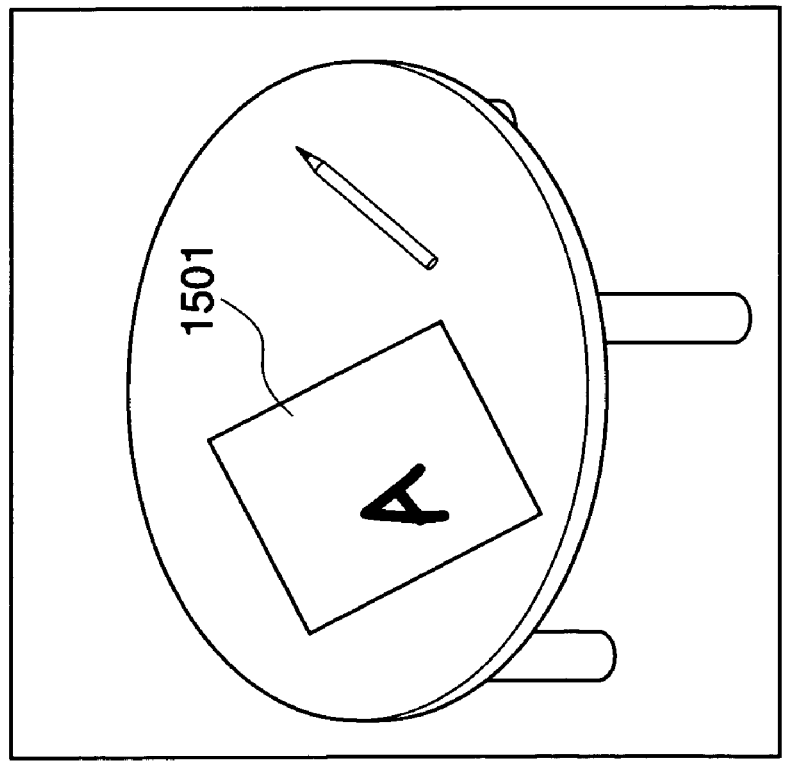

The frame data comparison part 1305 also performs detection in the case where, e.g., a manuscript has been moved, and based on movement-based differential data of manuscript position data, the image processing part 1306 performs image position correction processing such as image rotation, and stores manuscript data with angles and sizes identical with preceding frame data in the image memory B 1307. Specifically, consider the case where, after a manuscript 1501 is placed at a position as shown in FIG. 15A and a character has been written, the manuscript is moved and rotated to a position as shown in FIG. 15B. A movement of manuscript position is identified by frame data comparison processing of the frame data comparison part 1305, the image processing part 1306 performs position correction processing, and only, e.g., user-handwritten character can be stored in the image memory B 1307.

Figure 16:
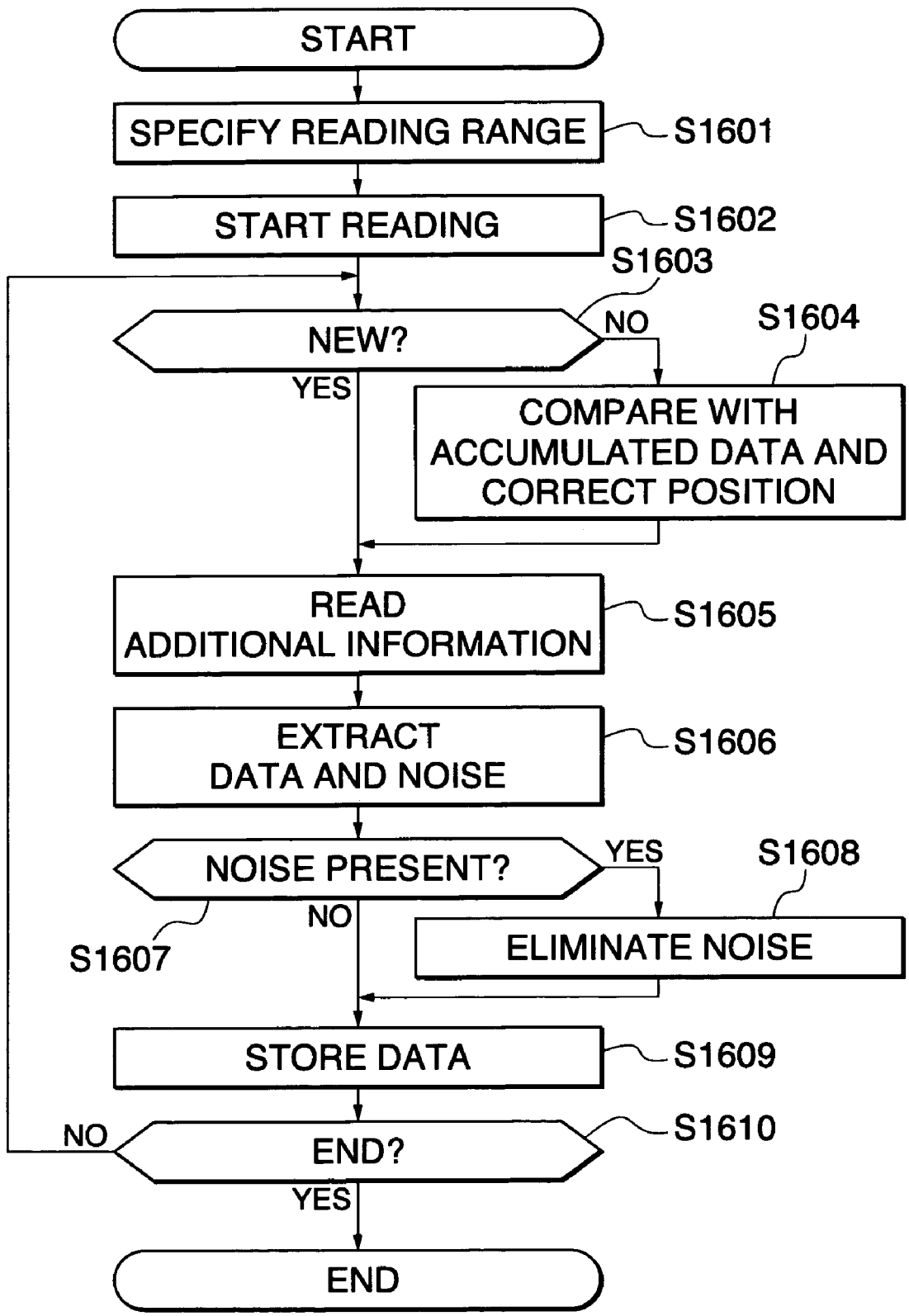
FIG. 16 is a drawing showing a processing flow of the image processing apparatus of the present invention.

FIG. 16 shows a processing flow of data reading and data storing in the image processing apparatus of the present invention.

In step S1601, a reading range is specified. This can be done by displaying, on a monitor through the image memory B 1307, data stored in the image memory A 1304 after being picked up by the three-dimensional image pickup apparatus 1300 as shown in FIG. 13 and specifying a reading range on the display screen. An image in an area specified as a reading range is stored in the image memories A and B as initial frame data, and are used as frame data comparison data and storage data.

In step S1602, data reading is started, and in step S1603, it is judged whether the read data is data newly picked up. If it is not data newly picked up, in step S1604, the data is compared with accumulated image data, namely, image data comparison is performed by the frame data comparison part 1305, position correction processing described using FIG. 15 is performed, and then in step S1605, additional information is extracted and read.

In steps S1606 and S1607, the frame data comparison part 1305 compares images over several frames to determine whether the added information is information newly written with a pen, etc. or is not-written information such as a pen and user's hand, that is, noise. If it is judged that the added information is noise, in step S1608, the image processing part 1306 deletes the noise information.

In step S1609, only required data is stored in the image memory B 1307, and in step S1610, it is judged whether data input terminates, and if not so, that is, if a new image frame is inputted, processing in and after step S1603 is repeated.

For example, processing as shown in FIG. 17 can be performed in the frame data comparison part 1305 and the image processing part 1306 of the image processing apparatus of the present invention. When characters "AB" as shown in FIG. 17A are inputted and then a circle surrounding the characters is written as shown in FIG. 17B, frame data is stored in a time-series in the image memory A 1304, and by comparison of different frame data and extraction of differential data, only the circle except the characters can be extracted as shown in FIG. 17C.

As shown in FIG. 17D, only character data except a manuscript part can be extracted from character data containing the manuscript part as shown in FIG. 17E. This is achieved by storing an initial image of frame data picked up in a time-series by the three-dimensional image pickup apparatus as initial frame data and extracting, as storage data, only differential data based on the result of the frame data comparison part performing comparison between the initial frame data and frame data subsequently got.

Figure 18:
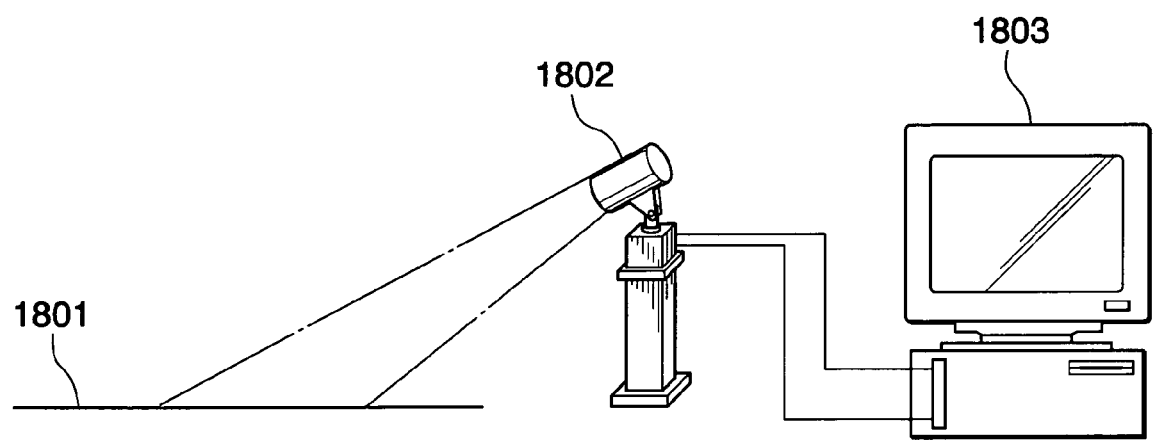
FIG. 18 is a drawing showing a configuration of the image processing apparatus of the present invention.
Figure 19:
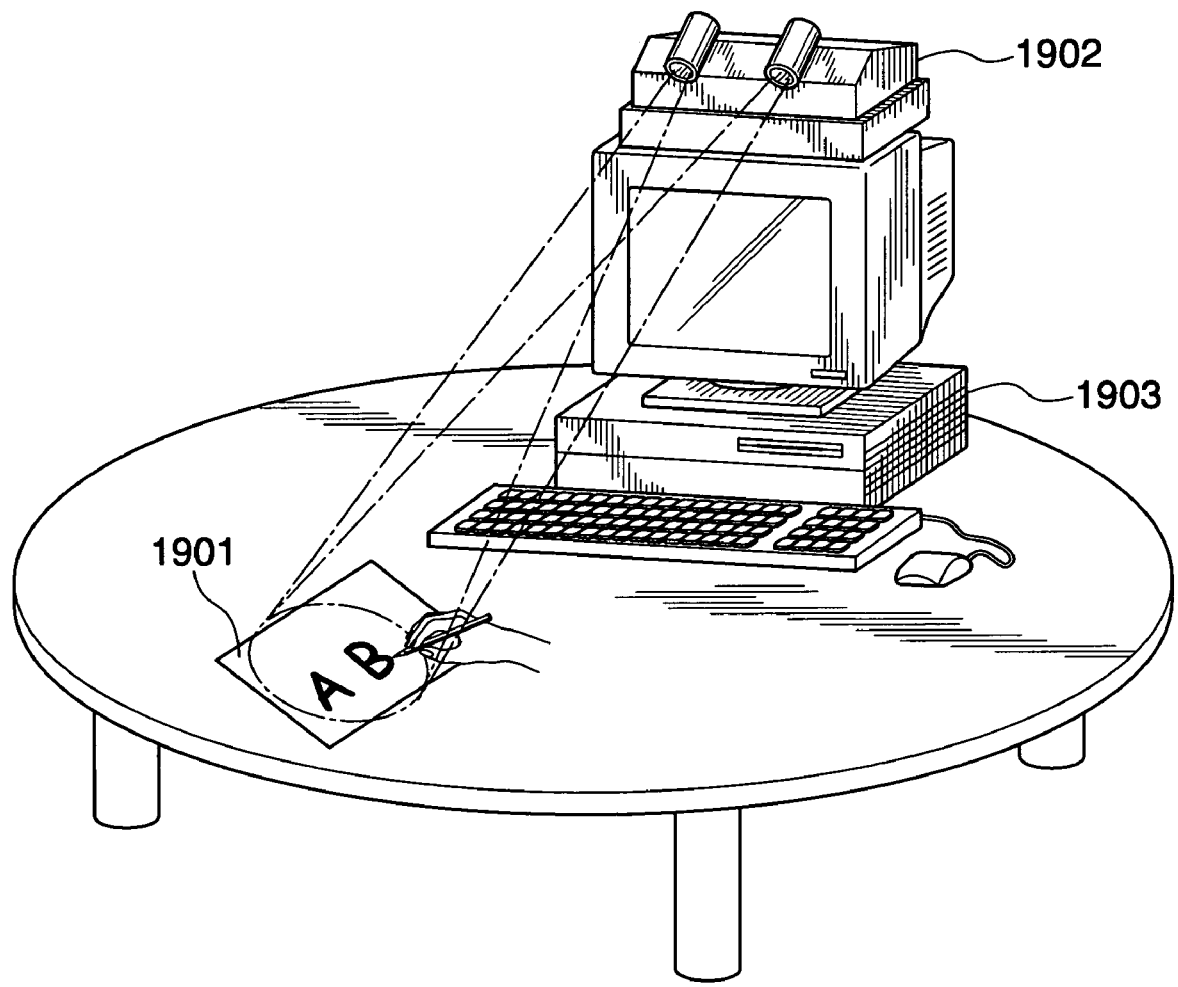
FIG. 19 is a drawing showing a configuration of the image processing apparatus of the present invention.

FIGS. 18 and 19 show examples of the configuration of the image processing apparatus of the present invention. FIG. 18 shows a three-dimensional image pickup apparatus 1802 as an image pickup part, and a separately configured personal computer (PC) 1803 as an image processing part that performs image processing, wherein they are connected through cables. Characters and other data recorded in a manuscript 1801 are subjected to image processing by the personal computer (PC) 1803 after intensity information and pattern projection image are got by the three-dimensional image pickup apparatus 1802.

FIG. 19 shows an integrated configuration of a three-dimensional image pickup apparatus 1902 as an image pickup part, and a personal computer (PC) 1903 as an image processing part that performs image processing. Characters and other data recorded in a manuscript 1901 are subjected to image processing by the personal computer (PC) 1903 after intensity information and pattern projection image are got by the three-dimensional image pickup apparatus 1902. A configuration is also possible in which an image pickup apparatus is incorporated in a further compact portable terminal.

In the first embodiment example, without applying the above-described re-coding method, by obtaining range information by various methods, processing may also be performed based on the obtained information. For an approach not using the re-coding method, projection of pattern light is not required.

[Second Embodiment Example]

Figure 20:
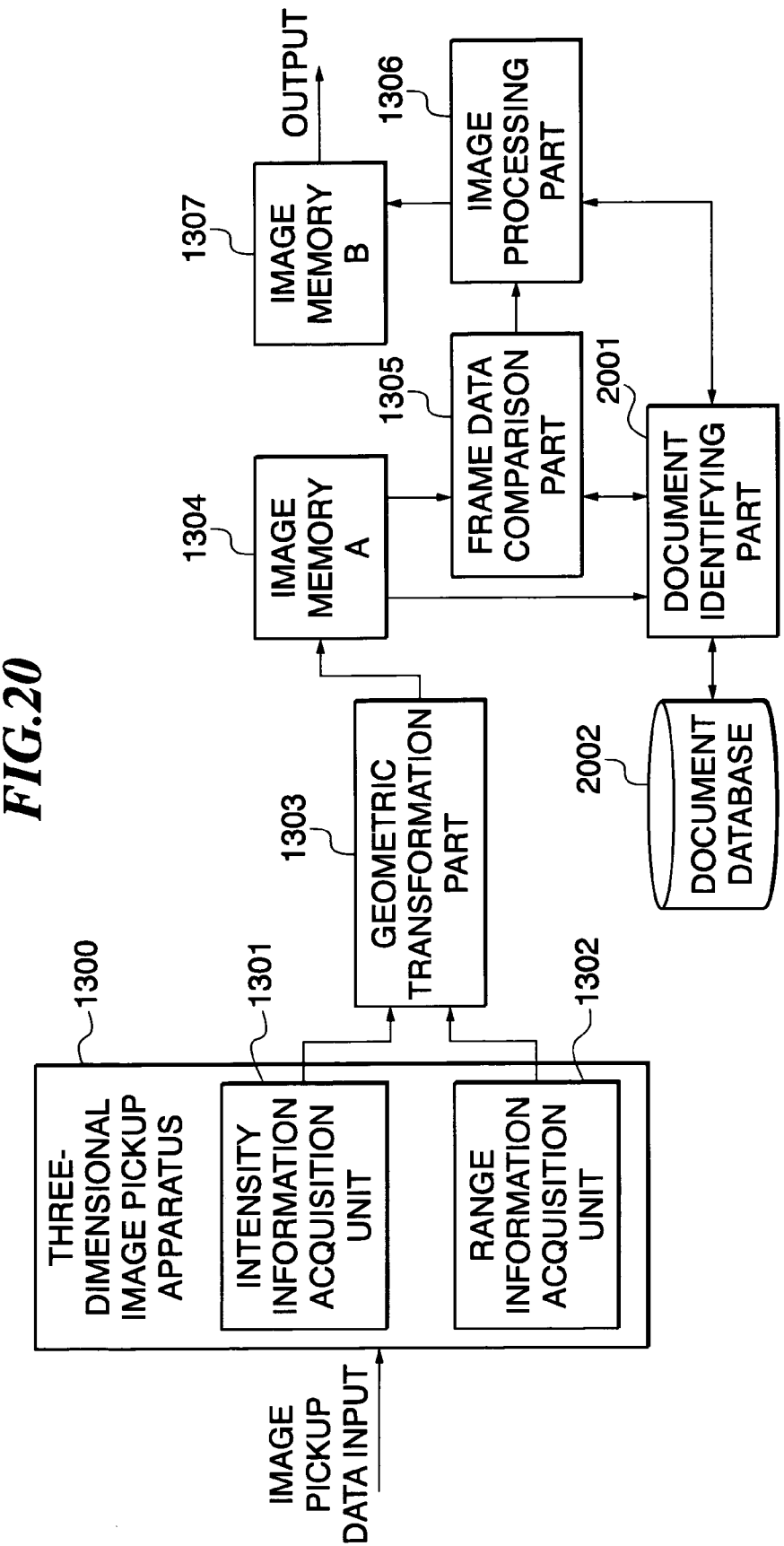
FIG. 20 is a drawing showing a configuration of a second embodiment example of the image processing apparatus of the present invention.

A description will be made of the configuration of a second embodiment example of an image processing apparatus for image reading. The configuration of the second embodiment example is shown in FIG. 20. In the configuration of FIG. 20, a document identifying part 2001 and a document database 2002 are added to the configuration described in the first embodiment example described previously.

The three-dimensional image pickup apparatus 1300 has the above-described configuration of FIG. 1, and is configured to create range information by, e.g., the re-coding method or other existing methods. Like the above-described first embodiment example, the three-dimensional image pickup apparatus 1300 includes the range information acquisition unit 1302 that obtains range information from, e.g., pattern images, and the intensity information acquisition unit 1301 that obtains intensity images as actual images.

The geometric transformation part 1303 performs geometric transformation for intensity images obtained by the intensity information acquisition unit 1301, based on range information obtained by the range information acquisition unit 1302. The geometric transformation identifies plural points, e.g., endpoint positions on a manuscript to be picked up, and adjusts the identified plural points so that they are placed at an equal distance from a camera serving as an image pickup part, that is, performs transformation into an image that would be obtained if the manuscript were picked up from the front thereof.

Intensity images transformed by the geometric transformation part 1303 are successively stored in the image memory A 1304 as time-series frame data. The frame data comparison part 1305 functions as an image extracting part that compares frame data stored in the image memory A 1304, and, for example, finds differential data of images. These processing operations are the same as in the first embodiment example.

In the second embodiment example, frame data stored in the image memory A 1304 is outputted to the document identifying part 2001. The document identifying part 2001 compares an input image and images stored in the document database 2002. The format data of various documents such as, e.g., bills, orders, and settlement sheets is stored in the document database 2002 so that it is compared with the image inputted from the image memory A 1304 to select a document having a higher level of similarity. Since frame data has been transformed by the geometric transformation part 1303 into an image that would be obtained if a manuscript were picked up from the front thereof, comparison processing by the document identifying part 2001 can be accurately performed.

Alternatively, instead of comparing image data itself, identification data such as ID, identification No., and bar code may be recorded in advance in parts of document so that the identification data is read from frame data stored in the image memory A 1304, and based on the read identification data, matching document data is obtained from the document database 2002. In this case, in the document database 2002, identification data and document format data must be stored with correspondence between them.

The image processing part 1306 obtains the format data of a document identified by the document identifying part 2001, and performs image extraction processing for retrieving newly added data, that is, user-written data by making comparison between the obtained format data and frame data inputted from the frame data comparison part 1305; and eliminates data judged as noise from data extending onto plural frames and stores data with unnecessary portions deleted in the image memory B 1307.

Data stored in the image memory B 1307 is outputted to a monitor, printer, storage part, etc. as required.

FIG. 21 shows an example of a document applicable as a writing form in the second embodiment example. A document shown in FIG. 21 is an example of a business trip bill having various entry items set in predetermined areas. Ordinary documents including this business trip bill are printed on paper. Users write desired information to predetermined frames.

Figure 22:
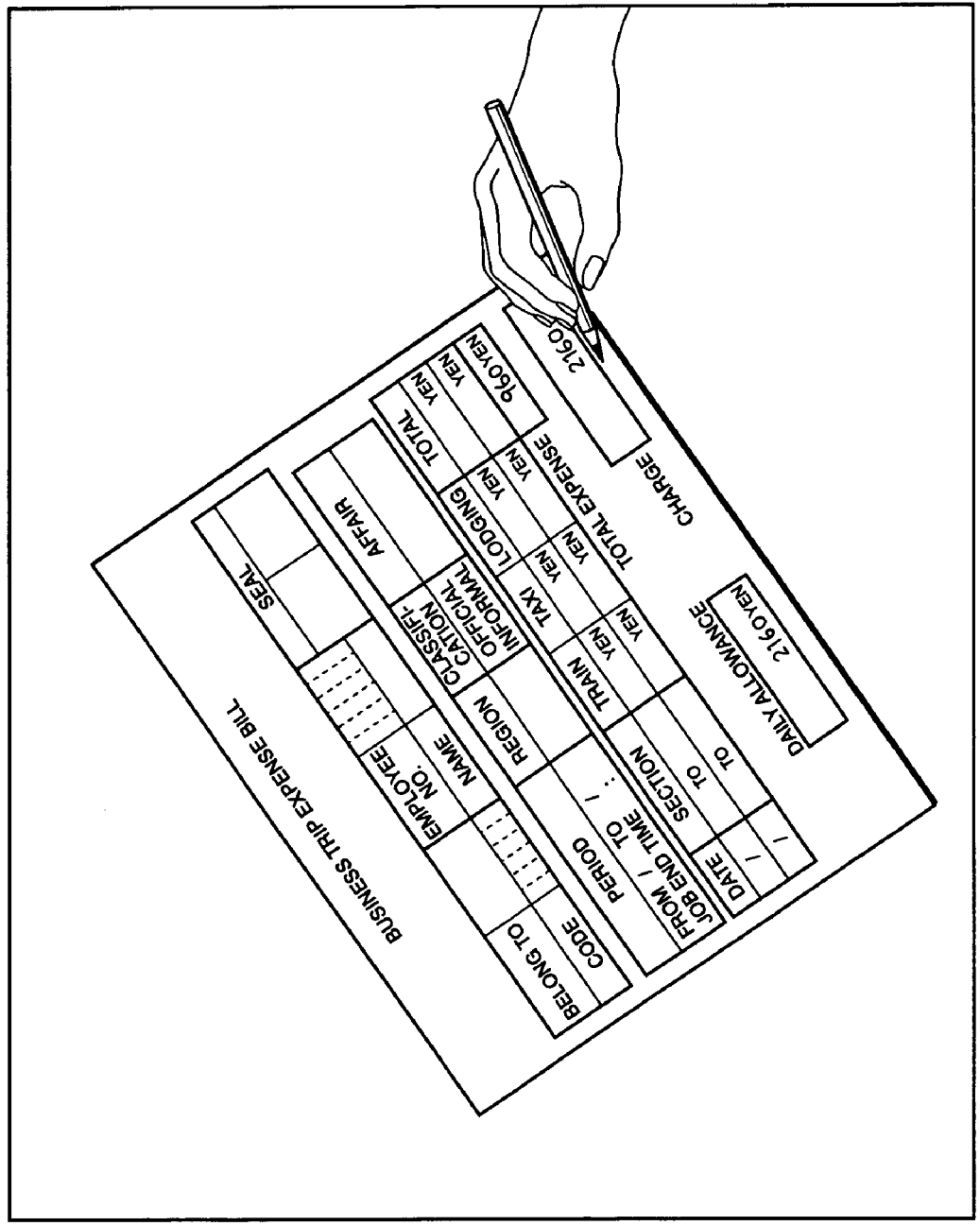
FIG. 22 is a drawing showing an example of data writing to the document format in the second embodiment example of the image processing apparatus of the present invention.

As shown in FIG. 22, a document paper is put at a place, e.g., desk at which a user is to perform entry operation on the document, and an image is read from the area in which the document paper is put, by an image reading apparatus having the same image pickup configuration as that in FIGS.

18 and 19. The read image is subjected to geometric transformation in the geometric transformation part 1303 and is stored in the image memory A 1304.

Image data stored in the image memory A is outputted to the document identifying part 2001, where matching with data stored in the document database 2002 is performed. This matching processing is, as described previously, performed by matching between image data and other image data, or matching by identification data. As a result of the matching processing, a matching document format is selected from the document database 2002, and in the image processing part 1306, user-written data is identified and extracted based on a difference between a format offered from the document database and frame data outputted from the frame data comparison part.

Figure 23:
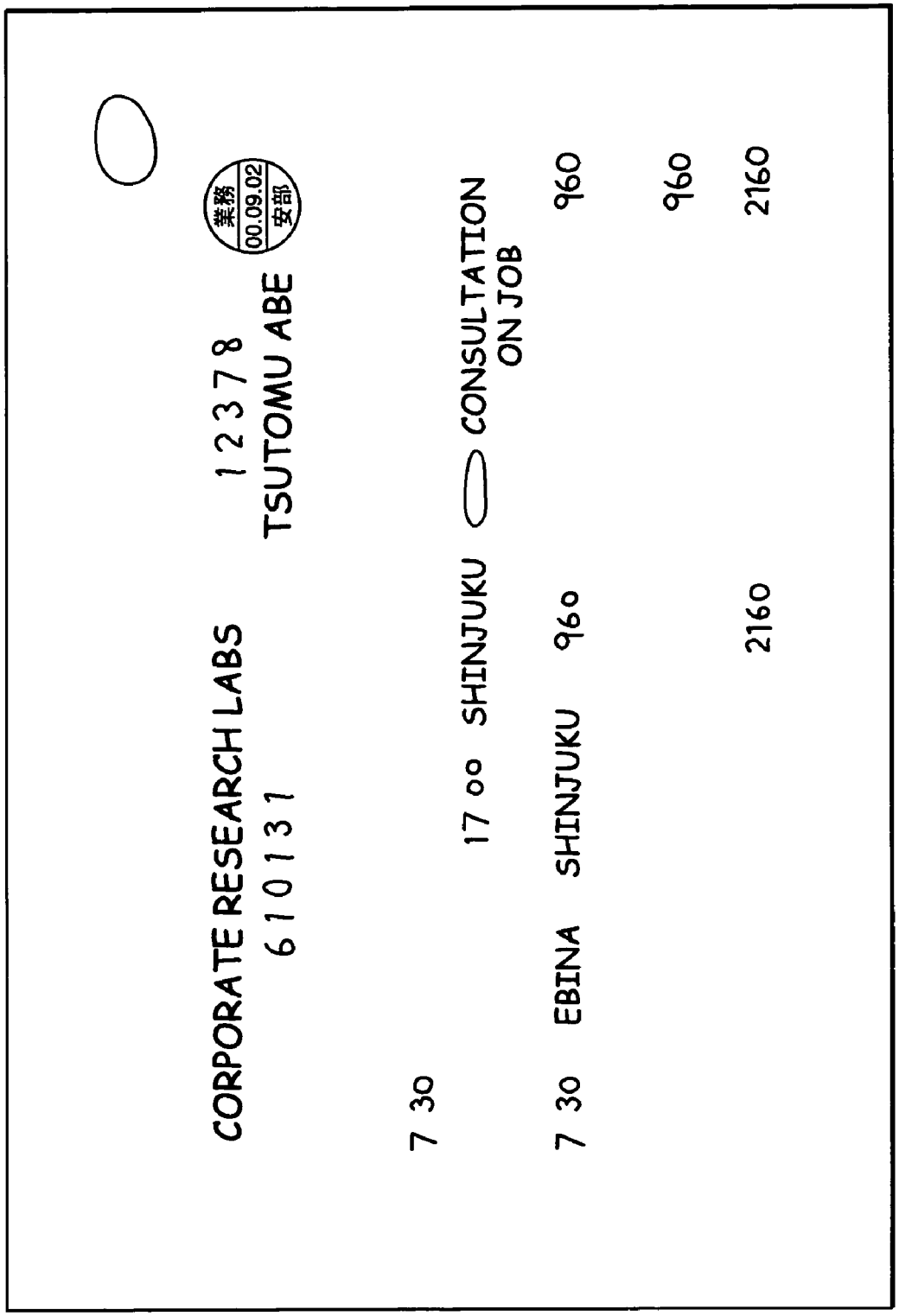
FIG. 23 is a drawing showing an example of extracting user-written data in the second embodiment example of the image processing apparatus of the present invention.

The image processing part 1306 selectively can output only newly written information to the image memory B, or output a format offered from the document database and newly written information in combination. Data with only newly written information extracted is, for example, as shown in FIG. 23.

By further providing the image processing part 1306 with an OCR function for identifying handwritten characters, handwritten characters can be identified so that data transformed as character data such as text data can be outputted. In this case, the image processing part 1306 can output (display, print, transfer, etc.) refined data as shown in FIG. 24 by writing transformation character data onto document format data inputted from the document identifying part.

By performing data identification processing corresponding to an entry position of a document format in the image processing part 1306, after transforming user-inputted character data at each entry position by the OCR function, the transformed data can be included in a database or spreadsheet software. For example, a table into which only given items are got, as shown in FIG. 25, can be created.

For example, an insurance application form often includes plural sheets stacked on one another so that identical information is written by a user to the plural sheets by carbon copy. Usually, one sheet is passed to the user for storage, and other sheets are used for computer processing by OCR or the like, shop storage, and other purposes. According to a technique of this embodiment example, a completed form is passed to a user for storage, and an image got by the above-described input apparatus can be used for other uses.

[Third Embodiment Example]

Figure 26:
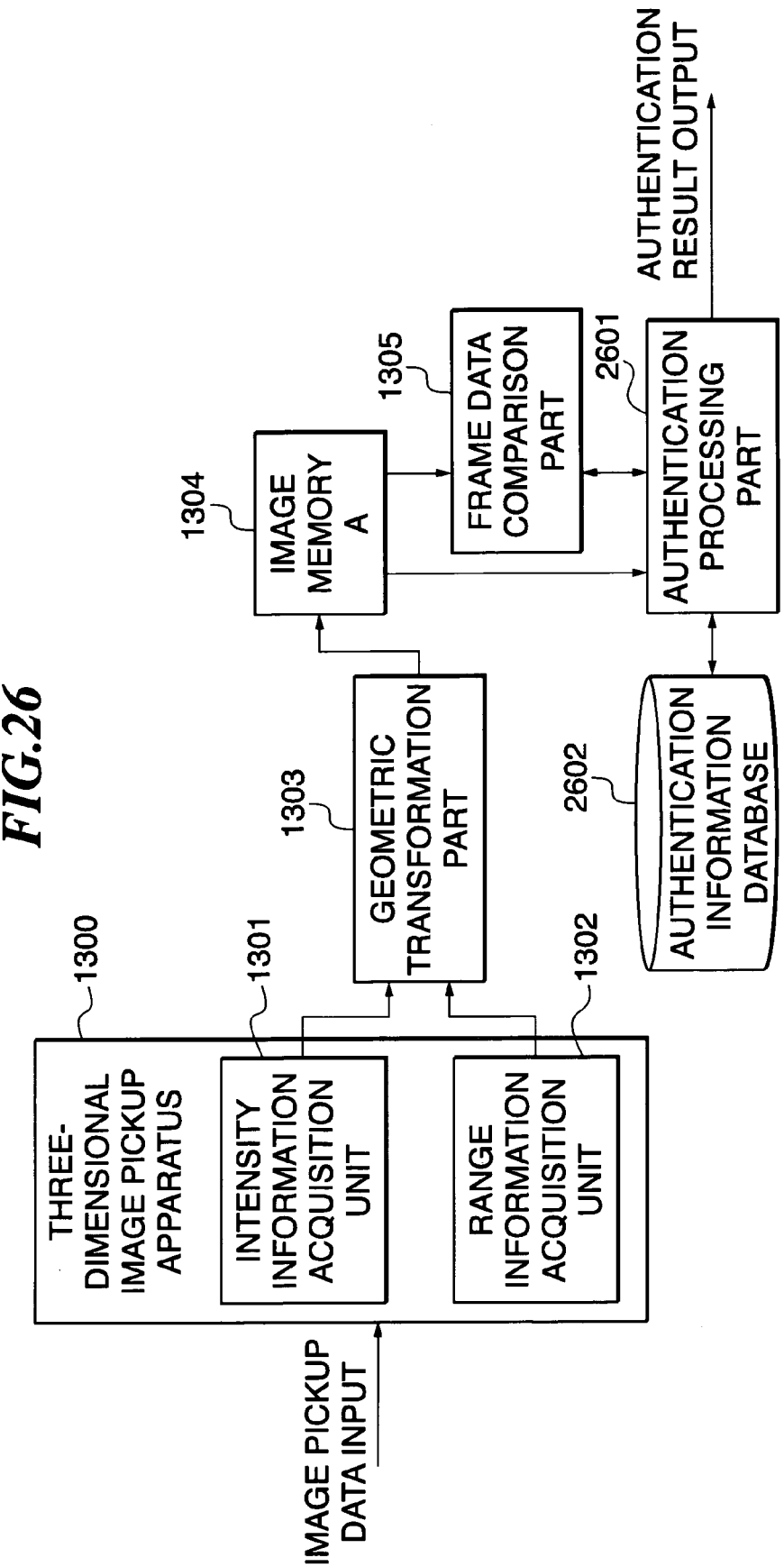
FIG. 26 is a drawing showing a configuration of a third embodiment example of the image processing apparatus of the present invention.

Next, a description will be made of the configuration of a third embodiment example of an image processing apparatus for image reading. The configuration of the third embodiment example is shown in FIG. 26. In the configuration of FIG. 26, an authentication processing part 2601 and an authentication information database 2602 are added to the configuration described in the first embodiment example described previously.

This third embodiment example is configured so as to be applied when signature-based individual authentication is performed. A user's signature is picked up and authentication is performed based on the history of written signature information. The shapes of handwritten signature are stored. Individual authentication is performed by comparison with an individual database in which a handwriting order and signature shapes are stored for each individual.

The three-dimensional image pickup apparatus 1300 in FIG. 26 has the above-described configuration of FIG. 1, and is configured to create range information by, e.g., the recoding method or other existing methods. Like the above-described first embodiment example, the three-dimensional image pickup apparatus 1300 includes the range information acquisition unit 1302 that obtains range information from, e.g., pattern images, and the intensity information acquisition unit 1301 that obtains intensity images as actual images.

The geometric transformation part 1303 performs geometric transformation for intensity images obtained by the intensity information acquisition unit 1301, based on range information obtained by the range information acquisition unit 1302. The geometric transformation identifies plural points, e.g., endpoint positions on a manuscript to be picked up, and adjusts the identified plural points so that they are placed at an equal distance from a camera serving as an image pickup part, that is, performs transformation into an image that would be obtained if the manuscript were picked up from the front thereof.

Intensity images transformed by the geometric transformation part 1303 are successively stored in the image memory A 1304 as time-series frame data. The frame data comparison part 1305 functions as an image extracting part that compares frame data stored in the image memory A 1304, and, for example, finds differential data of images. These processing operations are the same as in the first embodiment example.

In the third embodiment example, frame data stored in the image memory A 1304 is successively outputted to the authentication processing part 2601. The authentication processing part 2601 compares input frame information and images stored in the authentication information database 2602. Signature data of users registered as authentication targets is stored in the authentication information database 2602. Users' signature data is data obtained by performing image pickup on actual signatures of registered users. In the authentication information database 2602, each image frame data piece in signature process is stored, and a signature image after completion of signature is stored in association with a user's identifier.

The authentication processing part 2601 successively receives frame data stored in the image memory A 1304 to determine whether there is a match in image frame data stored in the authentication information database 2602. Alternatively, by having a user in advance enter an identification ID before signature, data corresponding to the identification ID may be obtained from the authentication information database 2602 to perform matching with the data.

Figure 27:
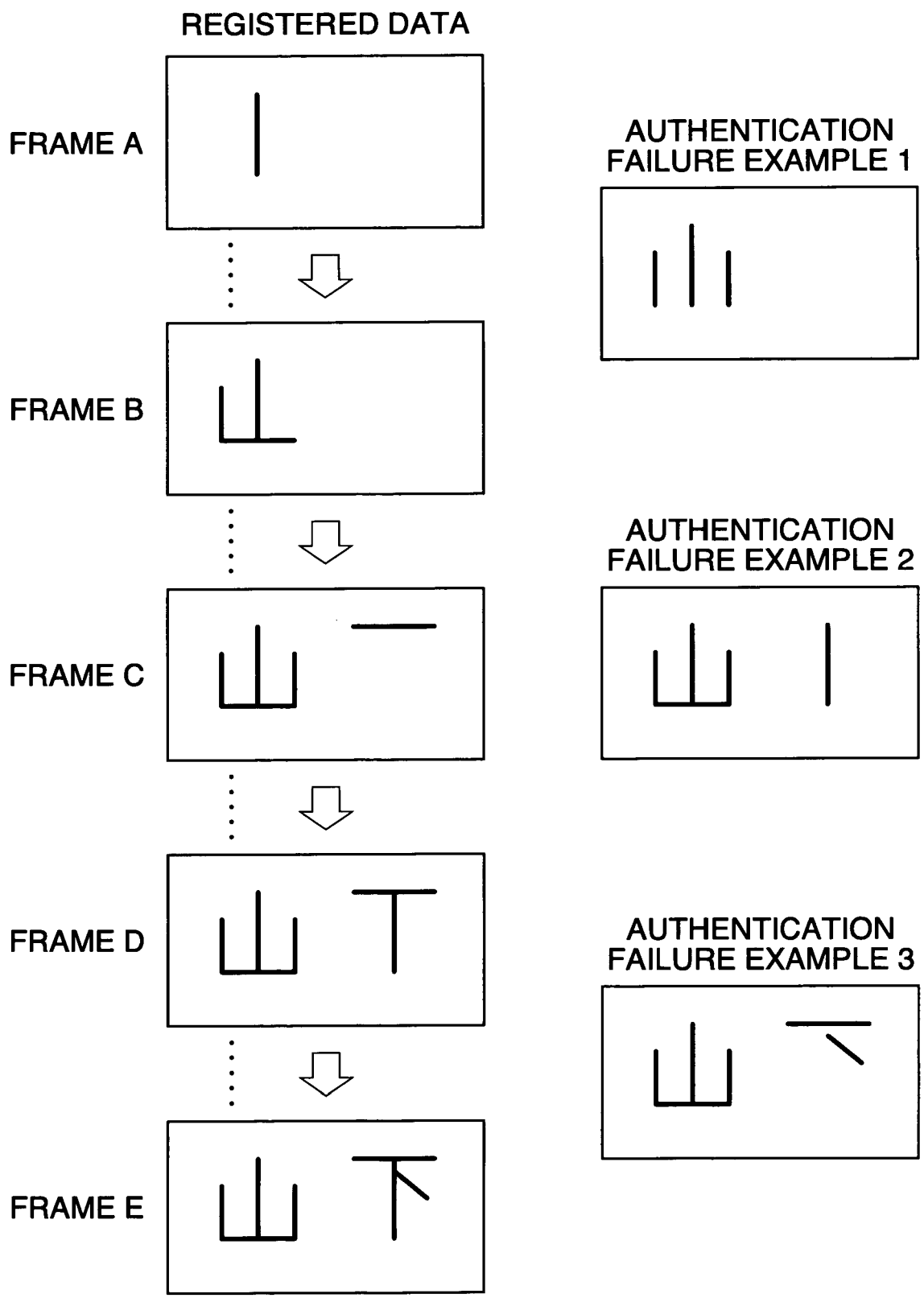
FIG. 27 is a drawing showing a data processing example in the third embodiment example of the image processing apparatus of the present invention.

FIG. 27 shows a specific example of matching processing performed in the authentication processing part 2601. Herein, an example of signature "Yamashita" written in kanji character is shown. The signature order of registered user name Yamashita is stored in the order of frames a to e shown to the left of FIG. 27 in the authentication information database 2602. There are many other stored image frames in the middle of the frames a to e.

The authentication processing part 2601 sequentially compares image frame data received from the image memory A 1304 with stored data. If all image frame data matches stored data, authentication succeeds, and if a frame different from stored data occurs, authentication fails. If an image of authentication failure example 1 shown to the right of FIG. 27 occurs between the frames a and b to the left, a handwriting order is apparently different from that of a registered user, and it is judged that the user is not a registered user. Likewise, if an image of authentication failure example 2 occurs between the frames b to d to the left, a handwriting order is apparently different from that of the registered user, and it is judged that the user is not a registered user. Likewise, if an image of authentication failure example 3 occurs between the frames d and e to the left, a handwriting order is apparently different from that of the registered user, and it is judged that the user is not a registered user.

Furthermore, the shape data of the entire signature after signature completion is stored in the authentication information database 2602. The authentication processing part 2601 receives an image after signature completion from the image memory A 1304 and matches it with data stored in the authentication information database 2602.

Although, in the above description, the authentication processing part 2601 is configured to directly receive data from the image memory A 1304, only differential data with a preceding frame generated in the frame data comparison part 1305 may be received from the frame data comparison part 1305 so that matching of handwriting order is performed based on the differential data.

[Fourth Embodiment Example]

Figure 28:
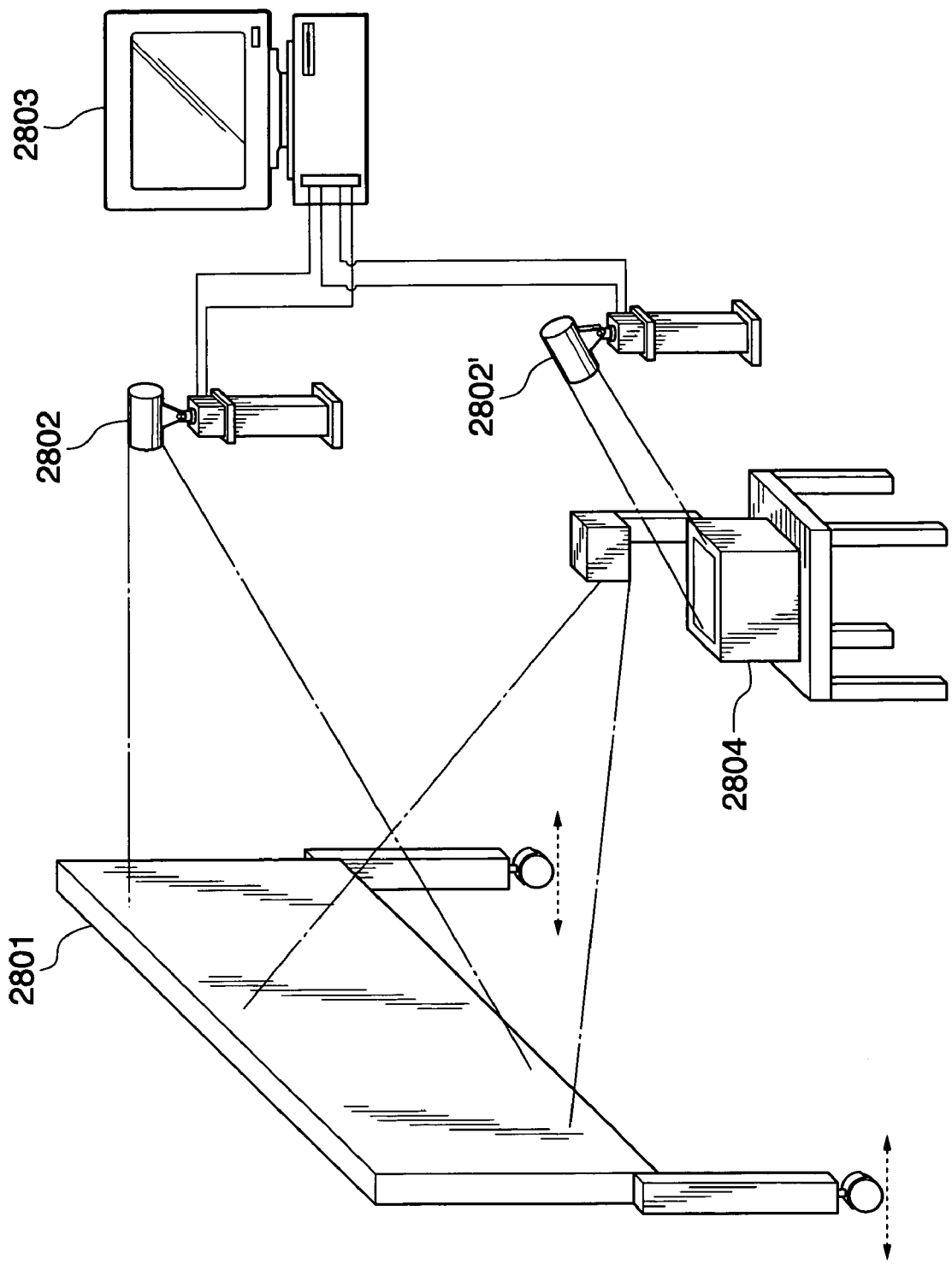
FIG. 28 is a drawing showing a configuration of a fourth embodiment example of the image processing apparatus of the present invention.

Next, a description will be made of the configuration of a fourth embodiment example of an image processing apparatus for image reading. The configuration of the fourth embodiment example is shown in FIG. 28. In the fourth embodiment example, characters and other information written to a whiteboard used in a presentation and a meeting are read.

In FIG. 28, characters, graphics, and the like are written to a whiteboard 2801 used as an image holding medium by a user with a writing tool such as a marker pen. Written characters and graphics can be erased using an eraser by the user.

Further, the image processing apparatus includes a three-dimensional image pickup apparatus 2802 as an image pickup part, and a personal computer (PC) 2803 as an image processing unit that performs image processing. The three-dimensional image pickup apparatus 2802 and the personal computer (PC) 2803 are connected with each other over, e.g., a communication cable, and have a configuration capable of data transfer. Characters and other data recorded in the whiteboard 2801 are subjected to image processing by the personal computer (PC) 2803 after intensity information and pattern projection images are got by the three-dimensional image pickup apparatus 2802.

The three-dimensional image pickup apparatus 2802 and the personal computer (PC) 2803 have one of the configurations of the first to third embodiment examples described previously. That is, they have the configuration of FIG. 13 described in the first embodiment example, FIG. 20 described in the second embodiment example, or FIG. 26 described in the third embodiment example.

The three-dimensional image pickup apparatus 2802, as shown in, e.g., FIG. 13 described in the first embodiment example, includes the range information acquisition unit 1301 that obtains range information, and the intensity information acquisition unit 1302 that obtains intensity images as actual images, and creates range information by the re-coding method or other methods.

The personal computer (PC) 2803 has the geometric transformation part 1303 configured as shown in FIG. 13, and performs geometric transformation for an intensity image acquired by the intensity information acquisition unit 1301, based on range information acquired by the range information acquisition unit 1302. The geometric transformation identifies plural points, e.g., endpoint positions on the whiteboard to be picked up, and adjusts the identified plural points so that they are placed at an equal distance from a camera serving as an image pickup part, that is, performs transformation into an image that would be obtained if the whiteboard were picked up from the front thereof.

Intensity images transformed by the geometric transformation part are successively stored as time-series frame data in the image memory A 1304 of FIG. 13 formed within the personal computer (PC) 2803. The frame data comparison part 1305 formed within the personal computer (PC) 2803 compares frame data stored in the image memory A 1304, and, for example, finds differential data of images.

The image processing part 1306 formed within the personal computer (PC) 2803 retrieves only data newly added from data obtained as a result of frame data comparison processing by the frame data comparison part 1305, eliminates data judged as noise from data extending into plural frames, and stores data with unnecessary portions deleted in the image memory B 1307 formed within the personal computer (PC) 2803.

Data stored in the image memory B 1307 is outputted to display units such as a monitor, externally connected printer, storage part, etc., formed within the personal computer (PC) 2803, as required.

Data stored in the image memory B 1307 can be projected to a monitor or screen on the PC, or other whiteboard. In this case, a projected image is a viewer-friendly image obtained as a result of transforming an image on the whiteboard 2801 to be picked up, as viewed from the front by the geometric transformation part 1303.

By forming the document identifying part 2001 and the document database 2002 described in the second embodiment within the personal computer (PC) 2803, data written by a user onto a document format projected on the whiteboard 2801 using, e.g., an OHP 2804 can be subjected to the same processing as described in the second embodiment example.

In other words, the document format is identified, only data written onto the document format projected onto the whiteboard 2801 is extracted, the extracted data is transformed by an OCR function, and the transformed data is embedded in predetermined statistical data (see FIG. 25); or character data transformed by an OCR is displayed as an image or printed according to a document format stored in a database (see FIG. 24).

By forming the authentication processing part 2601 and the authentication information database 2602 within the personal computer (PC) 2803, authentication can be performed based on a user's signature onto the whiteboard 2801.

Instead of performing these processing operations using data obtained by performing image pickup on characters, graphics, etc. directly written to the whiteboard 2801 by the three-dimensional image pickup apparatus 2802 as shown in FIG. 28, these processing operations may also be performed using data obtained by performing image pickup, by the three-dimensional image pickup apparatus 2802, an image projected onto the whiteboard 2801 by the OHP 2804 or other projecting apparatus for projecting data to the whiteboard 2801.

Alternatively, as shown in FIG. 28, data processing may also be performed by performing image pickup of a board face of the OHP 2804 by the three-dimensional image pickup apparatus 2802'. That is, image holding media can include various media such as a manuscript sheet, whiteboard, blackboard, screen, wall, screen projection sheet, and the like.

Figure 29:
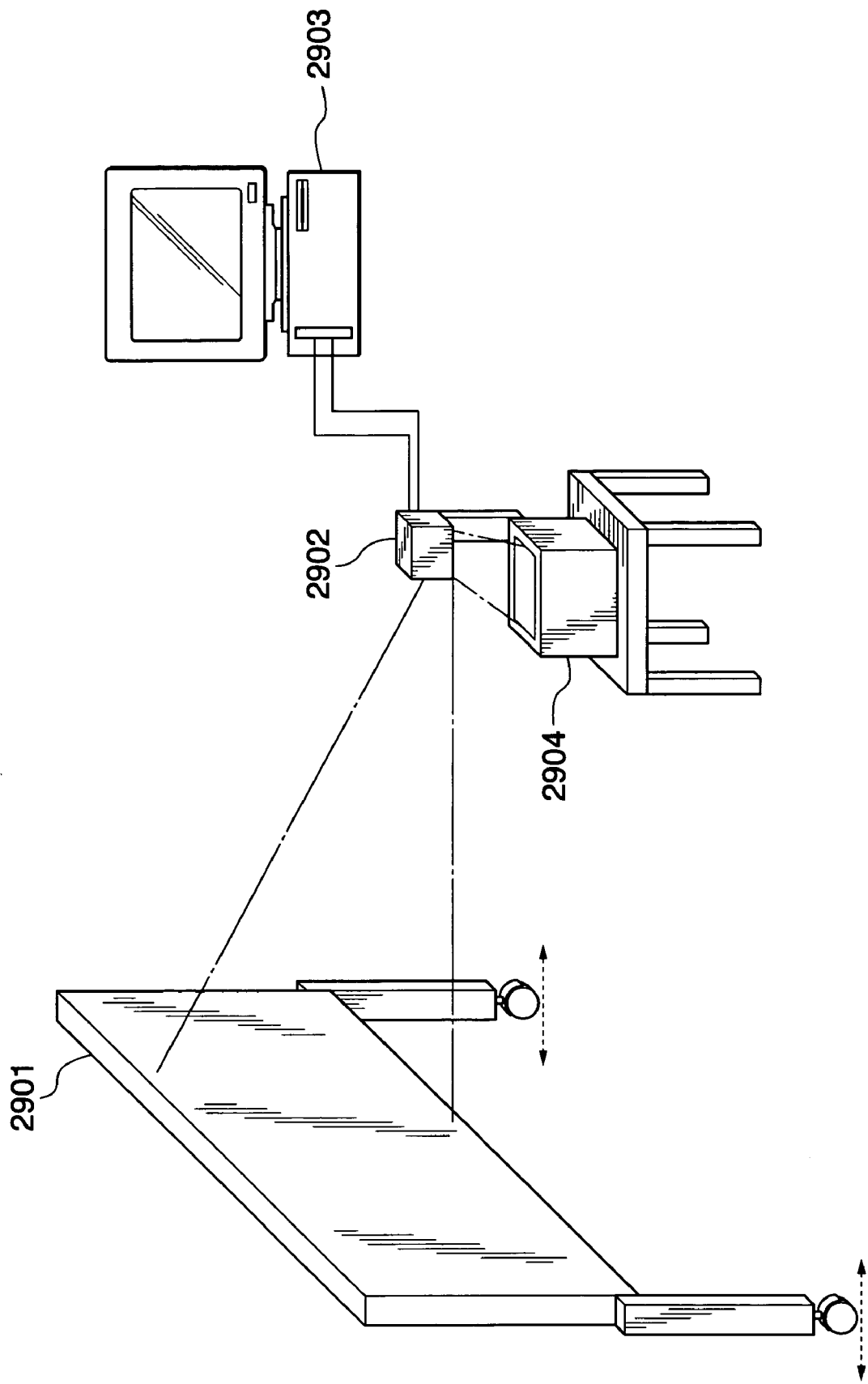
FIG. 29 is a drawing showing a variation of the configuration of the fourth embodiment example of the image processing apparatus of the present invention.

As shown in FIG. 29, in a configuration having an OHP 2904 for projecting data to a whiteboard 2901, and a personal computer (PC) 2903 for performing data processing, by incorporating a three-dimensional image pickup apparatus 2902 in an image pickup/projecting part of the OHP 2904, the equipment is reduced in size, and the distance between the three-dimensional image pickup apparatus 2902 and the board face of the OHP 2904 to be picked up is fixed so that stable data processing becomes possible.

[Fifth Embodiment Example]

Figure 30:
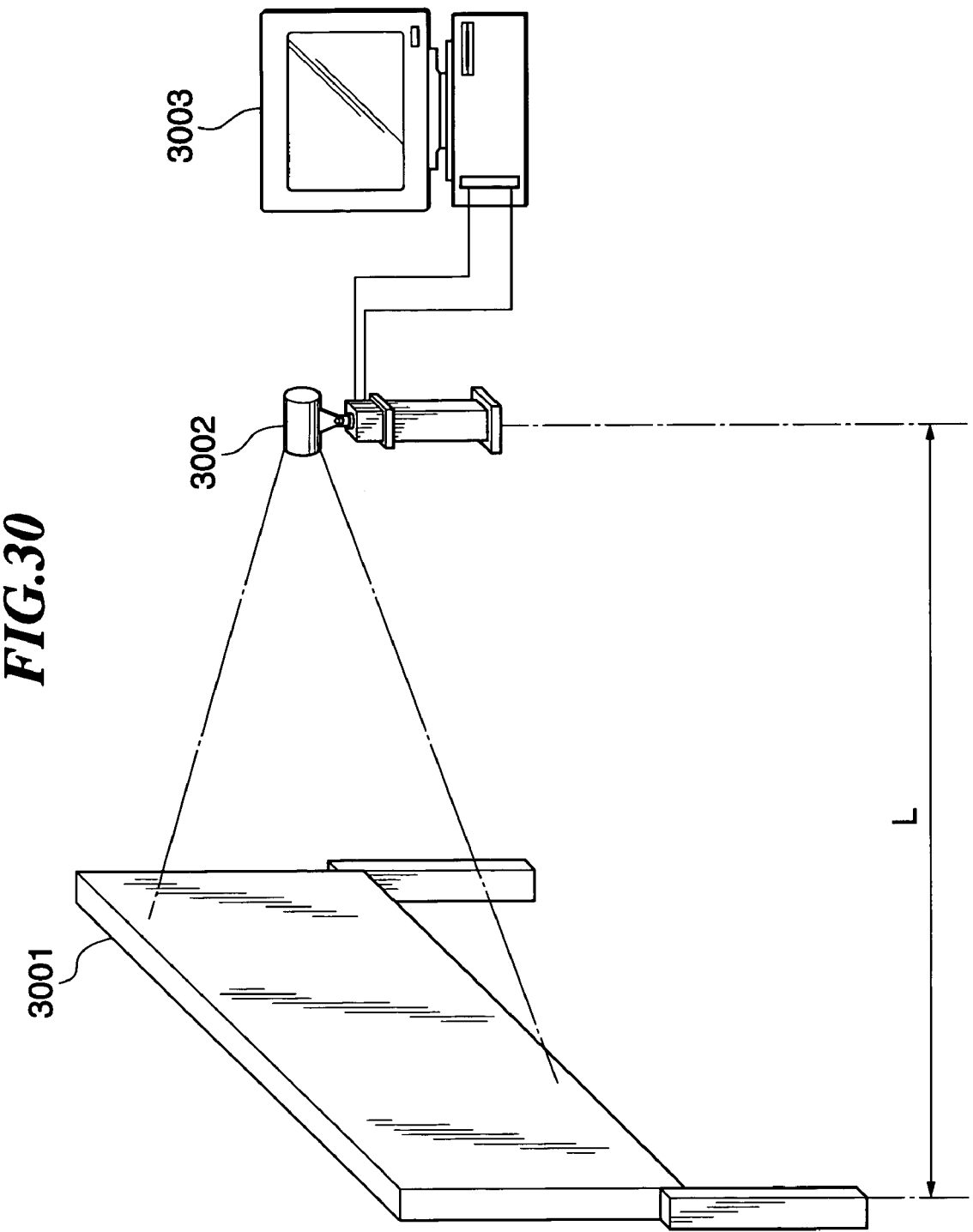
FIG. 30 is a drawing showing a configuration of a fifth embodiment example of the image processing apparatus of the present invention.
Figure 31:
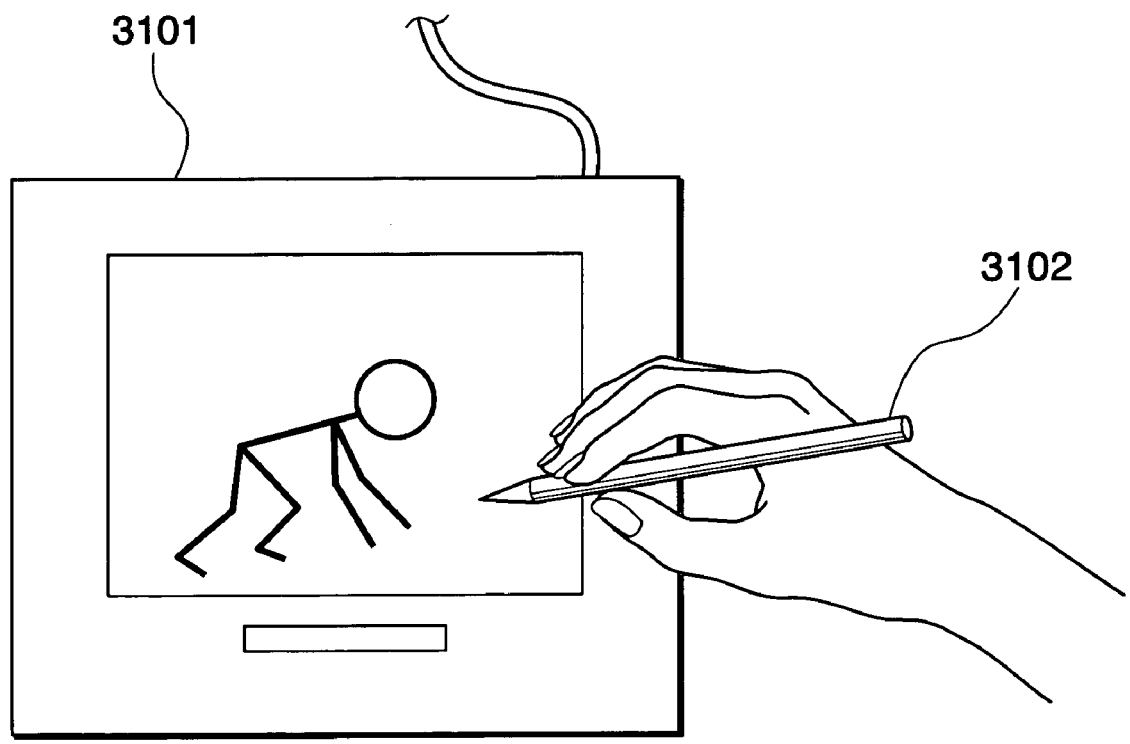
FIG. 31 is a drawing showing a conventional tablet-type character input apparatus.

Next, a description will be made of the configuration of a fifth embodiment example of an image processing apparatus for image reading. The configuration of the fifth embodiment example is shown in FIG. 30. In this embodiment example, like the fourth embodiment example, characters and other information written to a whiteboard used in a presentation and a meeting are read.

In FIG. 30, characters, graphics, and the like are written to a whiteboard 3001 by a user with a writing tool such as a marker pen. Written characters and graphics can be erased using an eraser by the user.

Further, the image processing apparatus includes a three-dimensional image pickup apparatus 3002 as an image pickup unit, and a personal computer (PC) 3003 as an image processing unit that performs image processing. The three-dimensional image pickup apparatus 3002 and the personal computer (PC) 3003 are connected with each other over, e.g., a communication cable, and have a configuration capable of data transfer. Characters and other data recorded in the whiteboard 3001 are subjected to image processing by the personal computer (PC) 3003 after intensity information and pattern projection images are got by the three-dimensional image pickup apparatus 3002.

The three-dimensional image pickup apparatus 3002 and the personal computer (PC) 3003 have one of the configurations of the first to third embodiment examples described previously. That is, they have the configuration of FIG. 13 described in the first embodiment example, FIG. 20 described in the second embodiment example, or FIG. 26 described in the third embodiment example.

The configuration of the fifth embodiment example is different from that of the fourth embodiment example in that the distance L between the whiteboard 3001 and the three-dimensional image pickup apparatus 3002 serving as an image pickup part is fixed. Therefore, distance measuring processing needs to be performed only once, and measured distance data is stored in a memory of the three-dimensional image pickup apparatus 3002 or the personal computer (PC) 3003 so that processing can be performed using the stored data. Hence, during processing for user-written data, without using an invisible light source as described in the first embodiment example, projection patterns of visible region can be projected.

While the present invention has been heretofore described in detail referring to specific embodiment examples thereof, it is evident that those skilled in the art will modify or have alternatives to the embodiment examples without departing from the sprit of the present invention. In other words, the present invention has been disclosed in the form of embodiment examples, which should not be limitedly interpreted. To judge the sprit of the present invention, claims described at the end of this specification should be referenced.

Processing described in this specification can be performed by hardware, software, or a combination of them. To perform the processing by software, a program in which a processing sequence is recorded can be executed after being installed in a memory of a computer incorporated in dedicated hardware, or the program can be executed after being installed in a general purpose computer that can perform different types of processing.

For example, the program can be stored in advance in a hard disk as a storage medium or ROM (Read Only Memory). Alternatively, the program can be temporarily or permanently stored in removable media such as CD-ROM (Compact Disc Read Only Memory), MO (Magnetic Optical) disk, DVD (Digital Versatile Disc), magnetic disk, and semiconductor memory. These removable recording media can be provided as so-called package software.

The program can be not only installed in a computer from the above-described removable recording media but also wirelessly transferred to a computer from a download site or transferred over wire to a computer via networks such as LAN (Local Area Network) or the Internet, while the computer can receive the program transferred in such a way and install it in a recording medium such as an internal hard disk.

As has been described above, the image processing apparatus and the image processing method of the present invention perform image pickup of characters, patterns, and the like written onto paper with a pen, perform geometric transformation for picked-up images, and perform natural input character analysis and reading processing. With a simple configuration, distances are measured, intensity images and distance measurement images, which are so-called actual images, are got in parallel, and input character identification processing can be efficiently performed by an intensity image analysis based on range information.

Furthermore, the image processing apparatus and the image processing method of the present invention compare images picked up in a time-series and can make noise detection, noise elimination, and manuscript position corrections by detection of a change in images, so that correct data reading becomes possible.

Furthermore, the image processing apparatus and the image processing method of the present invention extract differences between intensity images obtained as a result of geometric transformation for picked-up images and format images stored in a document database in which plural pieces of document format data are stored, and thereby extract user-written data, or transform the written data into text data, so that efficient document processing is achieved.

Furthermore, the image processing apparatus and the image processing method of the present invention match handwriting history data stored in an authentication information database in which handwriting history data of registered users is stored, with intensity images subjected to geometric transformation, whereby correct and efficient individual authentication processing is achieved.

Furthermore, the image processing apparatus and the image processing method of the present invention can perform processing for data written to writable components having a display function such as whiteboard, can easily transform picked-up images by geometric transformation into data observed from the front, and can redisplay the transformed data on a monitor, screen, or other whiteboard, so that a visually efficient display function can be provided.

The entire disclosure of Japanese Patent Application No. 2001-108353 filed on Apr. 6, 2001 including specification, claims, drawings and abstract is incorporated herein by reference in its entirety.

What is claimed is:

1. An image processing apparatus, comprising:
   a three-dimensional image pickup part that includes a projecting part that projects a pattern along a direction of an optical axis, a first image pickup part that picks up an intensity image and a projection pattern image deflected from the direction of the optical axis of the projecting part by a half mirror, and a second image pickup part that picks up the projection pattern image from a direction different from the optical axis of the projecting part, the three-dimensional image pickup part creating first range information based on a pattern picked up by the second image pickup part;

a geometric transformation part that performs geometric transformation for the intensity image picked up by the first image pickup part, based on the first range information;

a storage part that stores, as initial frame data, an initial image of frame data in a time-series transformed by the geometric transformation part;

a frame data comparison part that makes comparison between successive frame data images in the time-series transformed by the geometric transformation part; and an image processing part that retrieves only differential data between successive frame data in the time-series as storage data based on a result of the comparison of the frame data comparison part of the initial frame data and frame data subsequently transformed in the time-series.

2. The image processing apparatus according to claim 1, wherein, for an area where the amount of change of the pattern picked up by the first image pickup part with respect to the projection pattern is equal to or greater than a predetermined value, new code corresponding to the pattern picked up by the first image pickup part is assigned, and the first range information is created from the pattern picked up by the second image pickup part based on the new code.

3. The image processing apparatus according to claim 1, wherein
the image processing part eliminates noise data from the frame data image based on a result of the comparison between the frame data images in the frame data comparison part.

4. The image processing apparatus according to claim 1, wherein
the image processing part modifies a position of the frame data image based on a result of the comparison between the frame data images in the frame data comparison part.

5. The image processing apparatus according to claim 1, wherein:
the projecting part has a light source to emit light of an invisible region of a wavelength band; and
the first and second image pickup parts have a filter for transmitting light of the invisible region of the wavelength band and a filter for cutting off light of the invisible region of the wavelength band, and pick up the projection pattern image and intensity image in parallel.

6. The image processing apparatus according to claim 1, wherein, for an area where the amount of change of the pattern picked up by the first image pickup part with respect to the projection pattern by the projecting part is less than a predetermined value, second range information is created by deriving a correspondence between intensity information obtained by the first and second image pickup parts.

7. The image processing apparatus according to claim 1, wherein the second image pickup part includes plural image pickup parts that pick up the measurement target at different angles, and range information is created based on projection patterns respectively picked up by the plural image pickup parts of the second image pickup part.

8. An image processing method, comprising:
projecting a pattern by a projecting part along an optical axis direction;
picking up an intensity image and a projection pattern image by a first image pickup part deflected from the optical axis direction of the projecting part by a half mirror, and picking up the projection pattern image by a second image pickup part from a direction different from the optical axis direction of the projecting part;
creating first range information based on the pattern picked up by the second image pickup part;
performing geometric transformation for the intensity image produced by the first image pickup part based on the range information;
storing an initial geometric-transformed intensity image in a time-series transformed in the geometric transformation step;
making comparison between successive geometric-transformed intensity images in the time-series transformed in geometric transformation step; and
retrieving only differential data between successive geometric-transformed intensity images in the time series as storage data based on a result of the comparison of the comparison step of the initial geometric-transformed intensity image and geometric-transformed intensity images subsequently transformed in the time-series.

9. The image processing method according to claim 8, wherein the range information creation step includes the step of:
for an area where the amount of change of the pattern picked up by the first image pickup part with respect to the projection pattern is equal to or greater than a predetermined value, assigning new code corresponding to the pattern picked up by the first image pickup part, and creating the first range information from the pattern picked up by the second image pickup part based on the new code.

10. The image processing method according to claim 8, further comprising:
eliminating noise data from the frame data image based on a result of the comparison between the frame data images in the frame data comparison step.

11. The image processing method according to claim 8, further comprising:
modifying a position of the frame data image based on a result of the comparison between the frame data images in the frame data comparison step.

12. The image processing method according to claim 8, wherein:
a pattern light is formed by a light of an invisible-region of a wavelength band by using infrared or ultraviolet light as the light source; and
the pattern projection image and intensity image are picked up in parallel.

13. The image processing method according to claim 8, further comprising the step of:
for an area where the amount of change of the pattern picked up by the first image pickup part with respect to the projection pattern by the projecting part is less than a predetermined value, creating second range information by deriving a correspondence between intensity information obtained by the first and second image pickup parts.

14. The image processing method according to claim 8, wherein:
the second image pickup part includes plural image pickup parts that pick up the measurement target at different angles, and includes the step of creating range information based on projection patterns respectively picked up by the plural image pickup parts of the second image pickup part.

15. An image processing apparatus, comprising:
a projecting part that projects light from a baseline to an image holding medium to form an image thereon, the projecting part associated with a re-coding part that creates a code imposed in the image;
an image pickup part that picks up the image on the image holding medium projected by the projecting part, the image pickup part including a decoding part that detects the code created in the re-coding part;
an intensity image acquisition part that acquires an intensity image based on the image picked up by the image pickup part;
a range information acquisition part that acquires range information from the picked-up image by determining a distance between the image holding medium and the baseline based on the code;
a geometric transformation part that performs geometric transformation for the intensity image based on the range information acquired in the range information acquisition part;
an image extracting part that extracts difference between a geometric-transformed intensity image and an intensity image acquired in advance;
a storage part that stores, as the geometric-transformed intensity image, an initial geometric-transformed intensity image in a time-series transformed by the geometric transformation part;
the image extracting part making comparison between successive geometric-transformed intensity images in the time-series transformed by the geometric transformation part; and
an image processing part that retrieves only differential data between successive geometric-transformed intensity images in the time-series as storage data based on a result of the comparison of the image extracting part of the initial geometric-transformed intensity image and geometric-transformed intensity images subsequently transformed in the time-series, wherein the stored geometric-transformed intensity image is the initial geometric-transformed intensity image and the differential data between successive geometric-transformed intensity images in the time-series.

16. The image processing apparatus according to claim 15, wherein the image holding medium is one of a manuscript sheet, whiteboard, blackboard, screen, wall, and screen projection sheet.

17. The image processing apparatus according to claim 15, wherein the intensity image acquired in advance as a processing target in the image extracting part is a preceding frame image inputted precedent to the geometric transformation part.

18. The image processing apparatus according to claim 15, further comprising:
a storage part that stores image data, wherein the intensity image acquired in advance as a processing target in the image extracting part is the image data stored in advance in the storage part.

19. The image processing apparatus according to claim 15, further comprising:

a document database in which plural pieces of document format data are stored; and
a document identifying part that performs matching between the geometric-transformed intensity image and the pieces of document format data stored in the document database,
wherein the image extracting part extracts differences between the geometric-transformed intensity image and the pieces of document format data stored in the document database.

20. The image processing apparatus according to claim 15, further comprising a character transformation processing part that reads character data extracted by the image extracting part and identifies the character data with identification data.

21. The image processing apparatus according to claim 15, further comprising:
an authentication information database in which handwriting history data of registered users is stored; and
an authentication processing part that inputs the geometric-transformed intensity image and performs matching between the input image and handwriting history data stored in the authentication information database.

22. The image processing apparatus according to claim 21, wherein:
the authentication information database stores handwriting history data and signature shape data of registered users; and
the authentication processing part inputs the geometric-transformed intensity image and performs matching between the input image and the handwriting history data stored in the authentication information database, and between the input image and the signature shape data.

23. The image processing method according to claim 15, further comprising a display part that displays an image produced as a result of performing geometric transformation for the intensity image, based on the range information in the geometric transformation part.

24. The image processing apparatus claim 15, further comprising:
a storage part that stores range information acquired by the range information acquisition part,
wherein a distance between the image holding medium and the image pickup part is fixed, and the geometric transformation part performs geometric transformation for the intensity image based on the range information stored in the storage part.

25. An image processing method, comprising:
projecting light from a baseline to an image holding medium to form an image thereon;
creating a code to be imposed in the image;
picking up the image projected on the image holding medium and detecting the code imposed on the image;
acquiring an intensity image based on the image picked up in the image pickup step;
acquiring range information from the picked-up image by determining a distance between the image holding medium and the baseline based on the code;
performing geometric transformation for the intensity image based on the range information acquired in the range information acquisition step; and
extracting difference between the geometric-transformed intensity image and an intensity image acquired in advance;

storing, as the geometric-transformed intensity image, an initial geometric-transformed intensity image in a time-series transformed in the geometric transformation step;

making comparison between successive geometric-transformed intensity images in the time-series transformed in the geometric transformation step; and retrieving only differential data between successive geometric-transformed intensity images in the time-series as storage data based on a result of the comparison step of the initial geometric-transformed intensity image and geometric-transformed intensity images subsequently transformed in the time-series, wherein the stored geometric-transformed intensity image is the initial geometric-transformed intensity image and the differential data between successive geometric-transformed intensity images in the time-series.

26. The image processing method according to claim 25, wherein the image holding medium is one of a manuscript sheet, whiteboard, blackboard, screen, wall and screen projection sheet.

27. The image processing method according to claim 25, wherein the intensity image acquired in advance as a processing target in the image extracting step is a preceding frame image inputted precedent to the geometric transformation step.

28. The image processing method according to claim 25, wherein the intensity image acquired in advance as a processing target in the image extracting step is image data stored in advance in a storage part.

29. The image processing method according to claim 25, further comprising:

storing plural pieces of document format data in a document database; and performing matching between a geometric-transformed intensity image and the pieces of document format data stored in the document database, wherein the image extracting step extracts difference between the geometric-transformed intensity image and the pieces of document format data stored in the document database.

30. The image processing method according to claim 25, further comprising:

reading character data extracted in the image extracting step and identifies the character data with identification data.

31. The image processing method according to claim 25, further comprising:

storing handwriting history data of registered users in a authentication information database; and inputting the geometric-transformed intensity image and performing matching between the input image and the handwriting history data stored in the authentication information database.

32. The image processing apparatus according to claim 31, further comprising:

in addition to the handwriting history data, storing signature shape data of registered users in the authentication information database; and inputting the geometric-transformed intensity image and performing matching between the input image and the handwriting history data stored in the authentication information database, and between the input image and the signature shape data.

33. The image processing method according to claim 25, further comprising:

displaying an image produced as a result of performing geometric transformation for the intensity image based on the range information.

34. The image processing method according to claim 25, further comprising:

storing range information acquired in the range information acquiring step, wherein a distance between an image holding medium and the image pickup part is fixed and the geometric transformation for the intensity image is performed based on the range information stored in the storage step.

35. A storage medium readable by a computer, the storage medium storing a program of instructions executable by the computer to perform method steps for performing image processing, the method comprising the steps of:

projecting light from a baseline to an image holding medium to form an image thereon;

creating a code to be imposed on the image;

picking up the image formed on the image holding medium;

detecting the code created in the re-coding part;

acquiring an intensity image based on the image picked up in the image pickup step;

acquiring range information from the picked-up image by determining a distance between the image holding medium and the baseline based on the code;

performing geometric transformation for the intensity image based on the range information acquired in the range information acquisition step; and extracting difference between the geometric-transformed intensity image and an intensity image acquired in advance;

storing, as the geometric-transformed intensity image, an initial geometric-transformed intensity image in a time-series transformed in the geometric transformation step;

making comparison between successive geometric-transformed intensity images in the time-series transformed in the geometric transformation step; and retrieving only differential data between successive geometric-transformed intensity images in the time-series as storage data based on a result of the comparison step of the initial geometric-transformed intensity image and geometric-transformed intensity images subsequently transformed in the time-series, wherein the stored geometric-transformed intensity image is the initial geometric-transformed intensity image and the differential data between successive geometric-transformed intensity images in the time-series.

36. An image processing apparatus, comprising:

a projecting part that projects light from a baseline, the projecting part associated with a re-coding part that a creates code imposed in the image;

an image pickup part that picks up the projected light, the image pickup part including a decoding part that detects the code created in the re-coding part;

an intensity image acquisition part that acquires an intensity image from the picked-up light;

a range information acquisition part that acquires range information from the picked-up light by determining a distance from the baseline based on the code;

a geometric transformation part that performs geometric transformation for the intensity image based on the range information; and an image extracting part that extracts difference between the geometric-transformed intensity image and an intensity image acquired in advance;

a storage part that stores, as the geometric-transformed intensity image, an initial geometric-transformed intensity image in a time-series transformed by the geometric transformation part;

the image extracting part making comparison between successive geometric-transformed intensity images in the time-series transformed by the geometric transformation part; and an image processing part that retrieves only differential data between successive geometric-transformed intensity images in the time series as storage data based on a result of the comparison of the image extracting part of the initial geometric-transformed intensity image and geometric-transformed intensity images subsequently transformed in the time-series, wherein the stored geometric-transformed intensity image is the initial geometric-transformed intensity image and the differential data between successive geometric-transformed intensity images in the time-series.

37. An image processing method, comprising:
projecting coded light from a baseline;
picking up and decoding the projected coded light to produce picked-up light;
acquiring an intensity image from the picked-up light;
acquiring range information from the picked-up light by determining a distance from the baseline;
performing geometric transformation for the intensity image based on the range information; and
extracting difference between the geometric-transformed intensity image and an intensity image acquired in advance;
storing, as the geometric-transformed intensity image, an initial geometric-transformed intensity image in a time-series transformed in the geometric transformation step;
making comparison between successive geometric-transformed intensity images in the time-series transformed in the geometric transformation step; and
retrieving only differential data between successive geometric-transformed intensity images in the time-series as storage data based on a result of the comparison step of the initial geometric-transformed intensity image and geometric-transformed intensity images subsequently transformed in the time-series, wherein the stored geometric-transformed intensity image is the initial geometric-transformed intensity image and the differential data between successive geometric-transformed intensity images in the time-series.

38. A storage medium readable by a computer, the storage medium storing a program of instructions executable by the computer to perform method steps for performing image processing, the method comprising the steps of:
projecting coded light from a baseline;
picking up and decoding the projected coded light to produce picked-up light;
acquiring an intensity image from the picked-up light;
acquiring range information from the picked-up light by determining a distance from the baseline;
performing geometric transformation for the intensity image based on the range information; and
extracting difference between the geometric-transformed intensity image and an intensity image acquired in advance;
storing, as the geometric-transformed intensity image, an initial geometric-transformed intensity image in a time-series transformed in the geometric transformation step;
making comparison between successive geometric-transformed intensity images in the time-series transformed in the geometric transformation step; and
retrieving only differential data between successive geometric-transformed intensity images in the time-series as storage data based on a result of the comparison step of the initial geometric-transformed intensity image and geometric-transformed intensity images subsequently transformed in the time-series, wherein the stored geometric-transformed intensity image is the initial geometric-transformed intensity image and the differential data between successive geometric-transformed intensity images in the time-series.

* * * * *